United States Patent
Trepanier

(10) Patent No.: US 10,348,997 B2
(45) Date of Patent: Jul. 9, 2019

(54) SECURITY VIDEO MONITORING CLIENT

(71) Applicant: Genetec Inc., St-Laurent (CA)

(72) Inventor: Jean-David Trepanier, St-Hubert (CA)

(73) Assignee: Genetec Inc., St-Laurent, QC (CA)

( * ) Notice: Subject to any disclaimer, the term of this patent is extended or adjusted under 35 U.S.C. 154(b) by 600 days.

(21) Appl. No.: 14/795,303

(22) Filed: Jul. 9, 2015

(65) Prior Publication Data

US 2017/0013226 A1 Jan. 12, 2017

(51) Int. Cl.
| | |
|---|---|
| H04N 5/445 | (2011.01) |
| H04N 7/18 | (2006.01) |
| H04N 21/4223 | (2011.01) |
| H04N 5/247 | (2006.01) |

(52) U.S. Cl.
CPC ......... *H04N 5/44591* (2013.01); *H04N 7/181* (2013.01); *H04N 21/4223* (2013.01); *H04N 5/247* (2013.01)

(58) Field of Classification Search
CPC .... H04N 7/181; H04N 7/44591; H04N 7/247; H04N 7/4223; B60R 2300/105; G08B 13/19641; G08B 13/19643; G08B 13/19645; G08B 13/19686; G08B 13/19678; G08B 13/1968; G08B 13/19682
USPC .......................................................... 348/159
See application file for complete search history.

(56) References Cited

U.S. PATENT DOCUMENTS

| | | | |
|---|---|---|---|
| 5,617,114 A * | 4/1997 | Bier ...................... G06F 3/0481 345/634 |
| 6,377,276 B1 | 4/2002 | Ludtke | |
| 6,647,200 B1 * | 11/2003 | Tanaka ............. G08B 13/19604 348/E7.086 |
| 6,680,739 B1 | 1/2004 | Robertus et al. | |
| 6,734,873 B1 | 5/2004 | Herf et al. | |
| 6,985,149 B2 | 1/2006 | Peercy et al. | |
| 7,477,264 B2 | 1/2009 | Grigorovitch et al. | |
| 7,623,140 B1 | 11/2009 | Yeh et al. | |
| 7,716,685 B2 | 5/2010 | Schechter et al. | |
| 7,925,978 B1 | 4/2011 | McGavran et al. | |
| 8,305,398 B2 | 11/2012 | Finger et al. | |
| 2005/0088436 A1 | 4/2005 | Swedberg et al. | |
| 2010/0033504 A1 | 2/2010 | Hart, II et al. | |
| 2012/0306912 A1 | 12/2012 | Blanco et al. | |

(Continued)

OTHER PUBLICATIONS

Aliaga, Daniel G., Martin Brenner, and Matthias Schneider-Hufschmidt. Implementation of Graphing Tools by Direct GUI Composition.

Brenner, Martin. "Designing Multimedia User Interfaces by Direct Composition."Multimedia. Springer Berlin Heidelberg, 1994. abstract.

Design Plans for Out-of-Process iframes http://www.chromium.org/developers/design-documents/oop-iframes.

(Continued)

*Primary Examiner* — Mohammed S Rahaman
*Assistant Examiner* — Jimmy S Lee
(74) *Attorney, Agent, or Firm* — Anglehart et al.

(57) ABSTRACT

A security video monitoring client system and method of presenting feeds within the same are disclosed. Out-of-process renderer components executing outside the client program provide an important performance advantage, particularly as to the number of video feeds to decode and/or render that can be decoded. This external thread execution strategy likewise facilitates fault isolation, shielding the client from undesired effects arising from the termination, restarting, and/or any other action to be taken as a result of anomalous operation of any one or more out-of-process renderer components.

13 Claims, 12 Drawing Sheets

(56) References Cited

U.S. PATENT DOCUMENTS

| | | | |
|---|---|---|---|
| 2013/0002864 A1* | 1/2013 | Lundberg | H04N 17/002 348/143 |
| 2013/0038794 A1 | 2/2013 | Ackley et al. | |
| 2013/0063445 A1 | 3/2013 | Blanco et al. | |
| 2013/0129324 A1 | 5/2013 | Uro et al. | |
| 2013/0205308 A1 | 8/2013 | Constable et al. | |
| 2013/0246576 A1* | 9/2013 | Wogsberg | H04N 7/181 709/219 |
| 2014/0072270 A1* | 3/2014 | Goldberg | H04N 9/87 386/223 |
| 2015/0097919 A1* | 4/2015 | Karimi-Cherkandi | H04L 65/80 348/14.07 |
| 2016/0148421 A1* | 5/2016 | Friend | G06T 3/40 345/629 |

OTHER PUBLICATIONS

GPU Accelerated Compositing in Chrome http://www.chromium.org/developers/design-documents/gpu-accelerated-compositing-in-chrome.

Kühme, Thomas, and Matthias Schneider-Hufschmidt. "Direct Composition of Adaptable Multimedia User Interfaces." Innovative Programmiermethoden für Graphische Systeme (1992): 97-110, abstract.

Prototyping of Graphing Tools by Direct GUI Composition—an Experience Report Daniel G. Aliaga, Matthias Schneider-Hufschmidt Requirements Engineering '93: Prototyping Berichte des German Chapter of the ACM pp. 317-334.

Schneider-Hufschmidt, Matthias. "Designing user interfaces by direct composition: prototyping appearance and behavior of user interfaces." User-Centred Requirements for Software Engineering Environments (1994): 235-251, abstract.

* cited by examiner

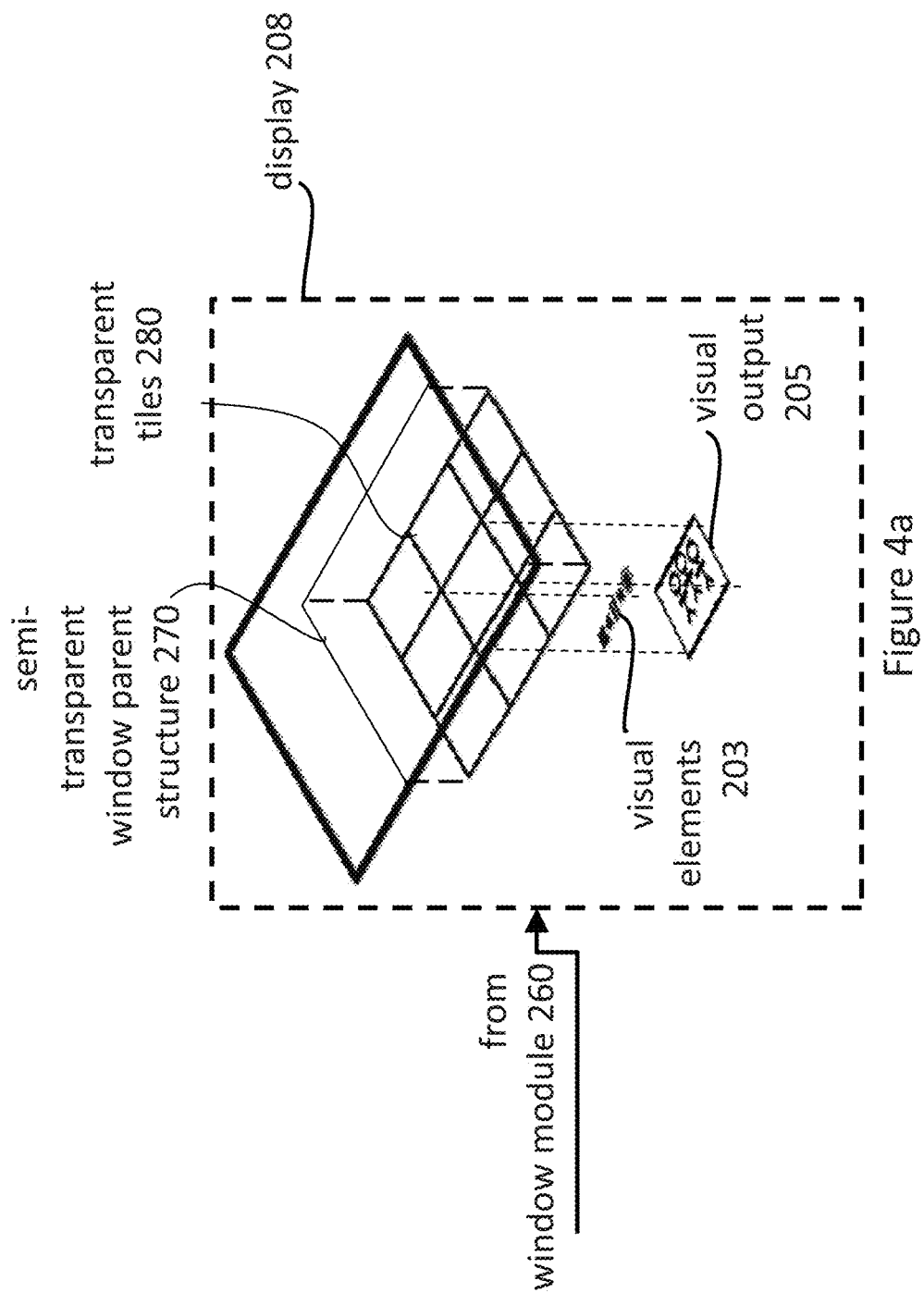

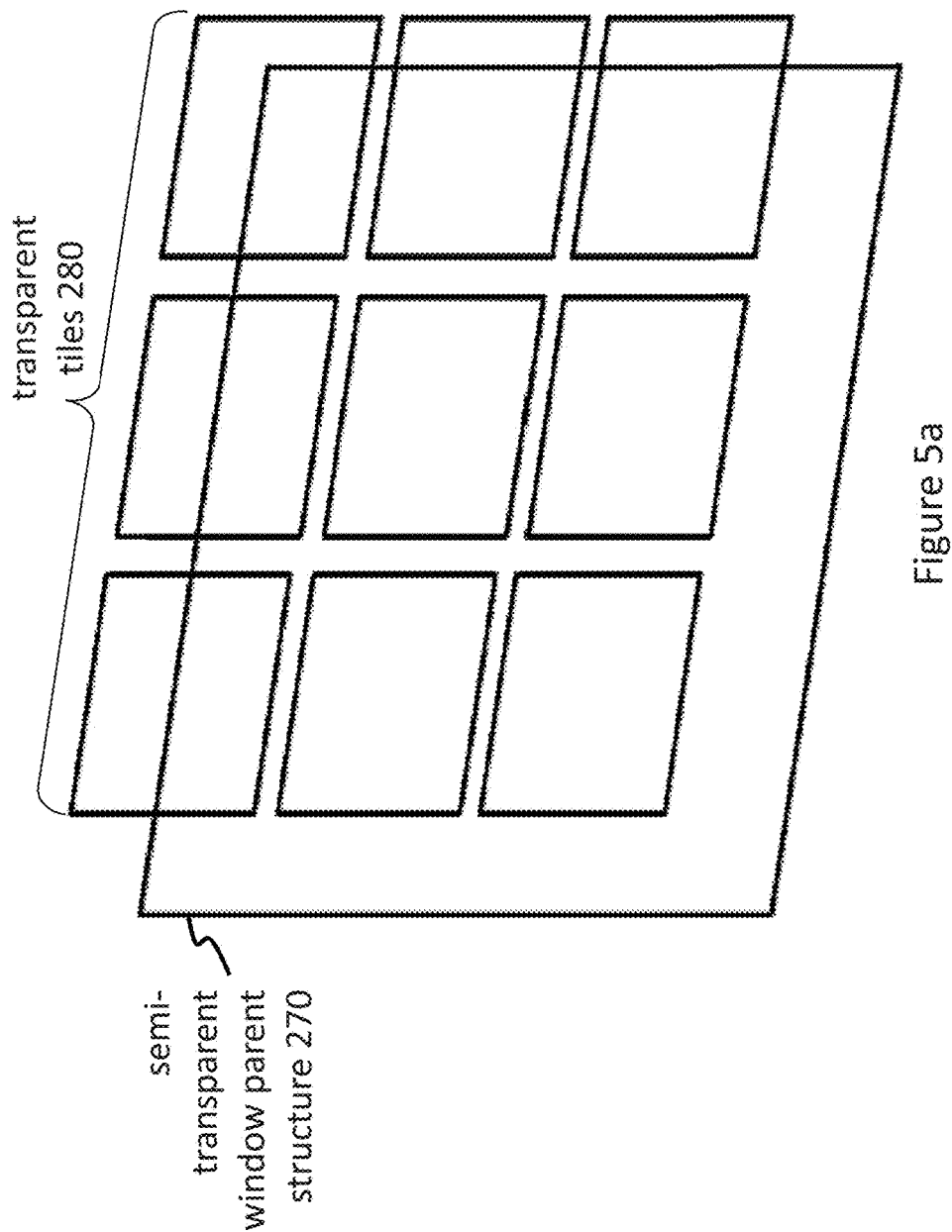

SECURITY VIDEO MONITORING CLIENT

TECHNICAL FIELD

The present relates to security software and more particularly to the presentation of multiple camera feeds in a security video monitoring system. The present also relates to managing the compositing of specific windowed components within a graphical operating system's desktop. More specifically, it relates to rendering different visual elements, including software components, plugins, or video feeds, each running within different operating system processes, while combining the relative appearance and operation of said components into a single seemingly integrated GUI experience as seen from a human user. The present also relates to handling said components subsequent to independent fault isolation of the same.

BACKGROUND

Incorporation of existing elements into new entities is a recurring theme in many areas of endeavor. Code reuse, whether specifically involving templates, procedures, functions, libraries, components and in some cases entire software works, has been practiced in various forms since the dawn of computing. Warnings against reinventing the wheel are well-known to engineers and software developers in general. Contemporary reuse of software components lives on, particularly in the form of add-ons, plugins, drivers, and various open source initiatives, each of these existing elements offering myriad modes of encapsulation or integration within new applications. More recently, the trend toward reuse in software contexts increased in popularity with the proliferation of open architectures that encourage the integration of third party components to operate within the framework some larger application. One characteristic of such component integration involves coherent interaction between the integrated components and integrating applications. In many cases, the incorporation is seamless, as the former components, once integrated, appear to form a native part of a given application.

Yet despite its many benefits, component reuse in general and integration of third-party content in particular often carry with them the original shortcomings of said component. Furthermore, the extent of said shortcomings may be known in certain cases and accordingly worked around. In other cases, these shortcomings remain largely or entirely unknown and are only discovered following subsequent integration within an application. The latter involves a transfer of risk and vulnerability to the party integrating or importing said components (in addition to users of said resulting software), as the latter components' stability is not guaranteed. Relatedly, the often ambiguous nature and extent of the instability is an ill-defined characteristic. This flows from the fact that lack of stability in third party components undermines the stability of our client's application overall.

A related consideration to software component reuse is the specific paradigm by which said reused components are actually integrated. In the case of applications that make use of numerous graphics and/or video components, one important integration paradigm is that of compositing window elements. Compositing, also called composition, involves combining various elements from different graphical sources or respectively superposing them. Such sources may consist of the graphical outputs from one or more computer applications. A computer system's compositing functionality, typically implemented via a compositing window manager disposed within said system's graphical section, aims to generate a resulting output or "scene" comprising output from various display applications whose contents appear as though all said graphical elements are part of the same scene.

Techniques to correctly determine the value of each pixel within a display require considerable processing resources. Notably, such techniques involve identifying the topmost element (i.e. the item having the highest Z-order value) among two or more overlapping two-dimensional objects, this process being somewhat iterative and complexified when multiple superposed transparent objects are present. Additional resources are typically required if rapid changes associated with at any one or more said graphical elements occur, with further resources required when alpha compositing considerations are relevant. Although existing system-level compositing functionalities provide to each application its own compositing engine, said engines do not typically intercommunicate. This further causes said techniques to be resource-intensive, since such rapid changes are typically associated with increased display activity. Accordingly, composition for regions of pixels where such increased display activity takes place must be done more frequently than for those regions—or even overall displays—where less or no activity occurs. The need for increased composition activity typically results in increased demand placed on the responsible compositing window manager. Of course, to satisfy such increased demand for composition, a related increase in resource requirements is necessary. The absence of such resources result in a limited compositing capability of a computer system's display, with negative repercussions on performance and overall user experience using one or more applications on said computer system. To avoid such performance losses, dedicated handling of compositing functionality by graphics hardware has become commonplace. In certain cases, some technologies use screen scraping in order to mix different rendering technologies, however these techniques lack the efficiency required for video streams.

A noteworthy case in which composition capability is called for occurs when a considerable portion of a display area is occupied by a video window. Superposition of additional visual entities atop said video window, such as digital on-screen graphics (e.g. for branding or identification purposes), or user interface component objects (such as playback controls) may be imagined. The result of compositing is typically necessary for each pixel within a display, and any subsequent transparency or alpha channel blending atop it needs to be done as well. This is why ideally, such compositing is typically left to the graphics section—typically a dedicated graphics card. While such "stacking" of graphical entities (e.g. windowed applications) might be desirable for enhanced functionality, it likewise makes a system correspondingly vulnerable to the shortcomings of composition arising from the lack of communication between of respective compositing engines and the (windows and/or graphical elements of) various applications.

In the case of an application comprising an array of video feeds received from a network of security cameras, an intense amount of processing is required for compositing each feed in addition to the additional graphical information typically superposed upon each respective feed. The present state of the art limits the amount of video feed data that may be composited and displayed with respective additional visual entities atop said feeds, all while a computer system retains an acceptable level of performance. In addition, the growing need for both higher definition images and higher framerate within many applications in which lower quality video (such as security monitoring) was previously acceptable have made the status quo unacceptable, particularly in light of lacking inter-process communication between compositing managers.

Concurrent with the need to overcome, ensure, and maintain proper compositing functionality for high quality video applications is the need for a video monitoring system to cooperate with possibly numerous third-party software components, particularly for use in decoding and rendering graphical elements. Moreover, abnormal operation is a recurrent concern for all components within a system and said abnormal operation is all the more a cause for concern in cases where key components may be provided by third parties. A component reuse model admitting third party components introduces vulnerabilities resulting from component reuse may be minor or fairly innocuous. Yet in extreme cases, one or more reused components may be ill-suited, malfunctioning, or incompatible with the application as a whole into which they are integrated that the latter may crash, be impaired, and/or or terminate suddenly with particularly devastating consequences.

Likewise, window compositing is known for being a particularly compute-intensive operation. This is particularly the case when multiple desktop components contribute to the final image to be displayed. Computing the final color or shade of a pixel is likewise a constituent part of the compositing process. Various schemes to improve the performance of desktop compositing have been proposed but many of these are subject to the vagaries of operating system implementations, which typically differ from version to version. Retained and immediate mode rendering and composition capabilities are possible using various schemes, both software and hardware. However, a problem experienced with current client applications is that like all desktop applications, retained mode rendering prevails. Painting and repainting various portions of a desktop—including attendant garbage collection—becomes processing intensive, as all pixels of an entire desktop must be validated for the correctness of their pixel values, composition and rendering engines must operate on all of said pixels, following which said composition is issued to the graphics card. Such operations typically bear an enormous processing cost and have a correspondingly negative effect on user experience, blocking video decoding and playback threads typically present on the same process as a client application.

The isolation of software components both for purposes of encouraging component modularity as well as for facilitating fault isolation in design is known in specific fields of computing. However, overlapping technical challenges from the respective technologies of system-level computing and user interface applications involved in displaying graphical data and/or handling rapidly increasing volumes of video data have prevented a contemporary extension of such principles to fields such as video monitoring where they are needed. Such is the purpose of the present application.

SUMMARY

The present invention may typically be implemented on any of several platforms, including a security video monitoring workstation, one or several computers, and/or homologous processing devices.

Persons skilled in the art will be familiar with the notion of a Z-order; with reference to a graphical application, this notion typically refers to a precedence policy indicating, from a given vantage point, which items may—in whole or in part—appear closest or furthest from said vantage point. Said persons will likewise appreciate that, in the case of overlapping items, the notion may alternatively refer to which may item(s) appear to be superposed atop and therefore obscure the other(s).

Transparency as discussed herein is to be appreciated as a concept complementary to that of Z-order. Transparency refers to the generic quality of a window layer to let through, rather than block, the graphical content or attributes belonging to one or more window layers, as well as the circumstances under which said qualities are present. When such window layers have an inferior Z-order, their content or general graphical attributes are obscured by part or all of a graphical element located superjacent to them. Accordingly, semi-transparency may refer to imparting a measure of said transparency to an entire window layer while retaining a certain level of opacity; alternatively, semi-transparency may consist of providing delimited portions of a window with transparency while other portions of a window layer are entirely opaque.

According to a first aspect of the present invention, a window module instantiates and manages a graphical user interface comprising a semi-transparent window structure over at least a portion of the total area of said window structure. Said window structure includes an array of tiles, with each tile having a particular dimension within the semi-transparent region of said structure. An arraying module further positions and dimensions the visual outputs provided by one or more out-of-process renderer components to said window structure. The renderer components are said to be out-of-process because they perform their rendering tasks in one or more processes external to that of the client system described herein. Upon an electronic visual display, the visual outputs produced by said renderer components are presented subjacent to said window parent structure, said visual outputs placed in such manner as to line up each subjacent to a respective one of the aforementioned tiles, whose transparent quality allows a human user to view the visual outputs. An operations setup module causes the rendering of said plurality of security camera feeds by coordinating such tasks as initializing out-of-process renderer components to display any one or more said visual outputs, and by restarting any one of said out-of-process renderer components should an error or problem with rendering operation be encountered.

According to a second aspect of the present invention, a method of presenting a plurality of security camera feeds within a security video monitoring client system is described. This method includes implementing a semi-transparent window parent structure as discussed above, comprising an array of transparent tiles, with said window parent structure having particular dimensions. The method also includes positioning and dimensioning the visual outputs from one or more process renderer components subjacently the parent window structure so that each the visual outputs lines up with a transparent tile. Finally, the method includes rendering the security camera feeds by one or more out-of-process renderer components and restarting any one of these renderer components should an error or problem be encountered.

According to a third aspect of the present invention, a tangible machine-readable storage medium to manage and implement the operation of the second aspect as described is disclosed.

BRIEF DESCRIPTION OF THE DRAWINGS

The invention will be better understood by way of the following detailed description of embodiments of the invention with reference to the appended drawings, in which:

FIG. 4a shows an exploded conceptual view of the output of an embodiment's window module as output to a display, showing the relative z-order of a semi-transparent window parent structure, superjacent to an array of transparent tiles, subjacent to one of which tiles are shown visual elements of a non-renderer component, subjacent to which is shown an example visual output of an out-of-process renderer component.

FIG. 5a shows the conceptual relationship between a semi-transparent window parent structure and an array of transparent tiles, said tiles illustrated as subjacent to said window parent structure.

DETAILED DESCRIPTION

Figures 1, 2:
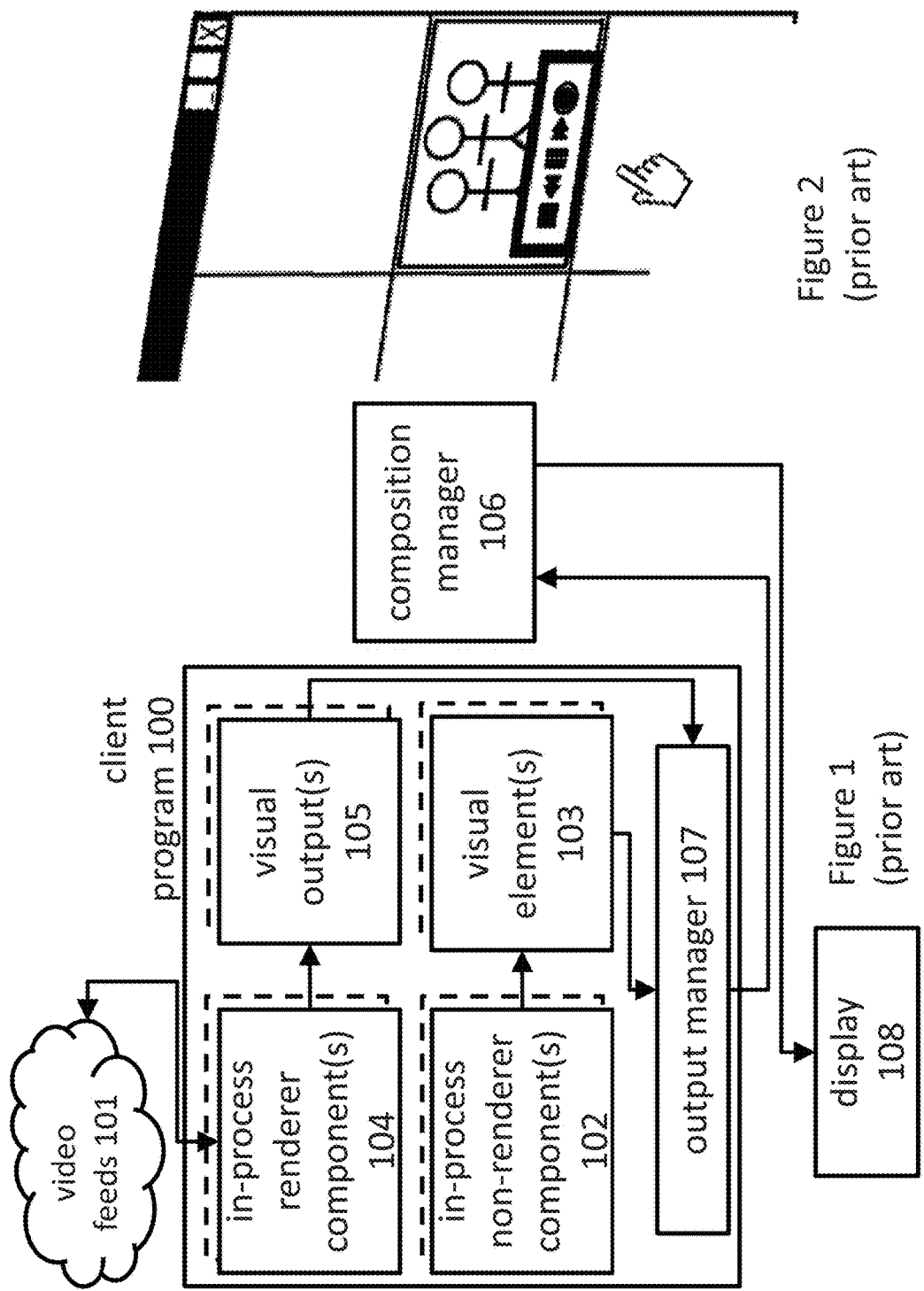
FIG. 1 shows a structural layout and interconnections view of the various modules comprising an embodiment of a prior art embodiment in which renderer and non renderer components, as well as their respective visual outputs and visual elements operate within the same process as the client program of said prior art embodiment.
FIG. 2 shows the conceptual relationship of a prior art embodiment in which an in-process renderer's visual element is laid out superjacently to an in-process renderer component's visual element and output within a tiled program window.

With reference to FIG. 1, comparable video monitoring systems known in the art consist of a client program 100 that receives video feeds 101 from one or more external sources, such as one or more cameras. Said program 100 typically blends elements such as user interface controls, on-screen graphics, and other visual elements 103 received from non-renderer components 102 running within the client program 100 process. Moreover, visual outputs 105 corresponding to the scenes captured through the video feeds 101 are received from renderer components 104 likewise operating in-process. These visual outputs 105 and visual elements 103 are typically received by an output manager 107 which amalgamates the foregoing 103, 105, implementing the layout of various tiles to composite in accordance with the requirements of the client program 100, before outputting the result to a composition manager 106, typically located externally to the client program 100, for actual composition. Said composition manager 106 handles the compositing duties required to composite the visual elements 103 atop the visual outputs 105 as required by the client program 100, in some cases for each one of a number of individual tiles (FIG. 2) corresponding to an individual video feed 101.

Persons skilled in the art will readily appreciate that in a computing context, the term "client" refers to an application that makes use of objects provided by another component. Accordingly, the location of a component is an essential element in describing said component with respect to a client. Thus, a component is said to operate "in-process" if it runs in the same process as a client, and "out-of-process" when it runs alone within a dedicated process. Furthermore, an out-of-process component has the benefit of possessing its own execution thread, whereas an in-process component uses the client's execution thread. As a result, the decision to run in-process or out-of-process may in certain scenarios be informed in part by design, implementation, and/or runtime considerations. For instance, if a component's operation is by its very nature likely to slow down or otherwise impair the client's execution thread, said component is likely best run out-of-process. Alternatively, if a component does not considerably impact the operation of the client, then it may run in-process and benefit from the fact that no transmission across processes need take place for it to properly execute. Additionally, a given application with one bitness (e.g. 64 bits) may require but be unable to load a much-needed component with a different bitness (e.g. 32 bits). Segregating the operation of certain components within distinct processes may thus likewise be necessary in cases where disparities exist in the respective bitnesses of multiple components that are otherwise expected to interoperate. These considerations play an important role in embodiments disclosed herein.

Figure 3:
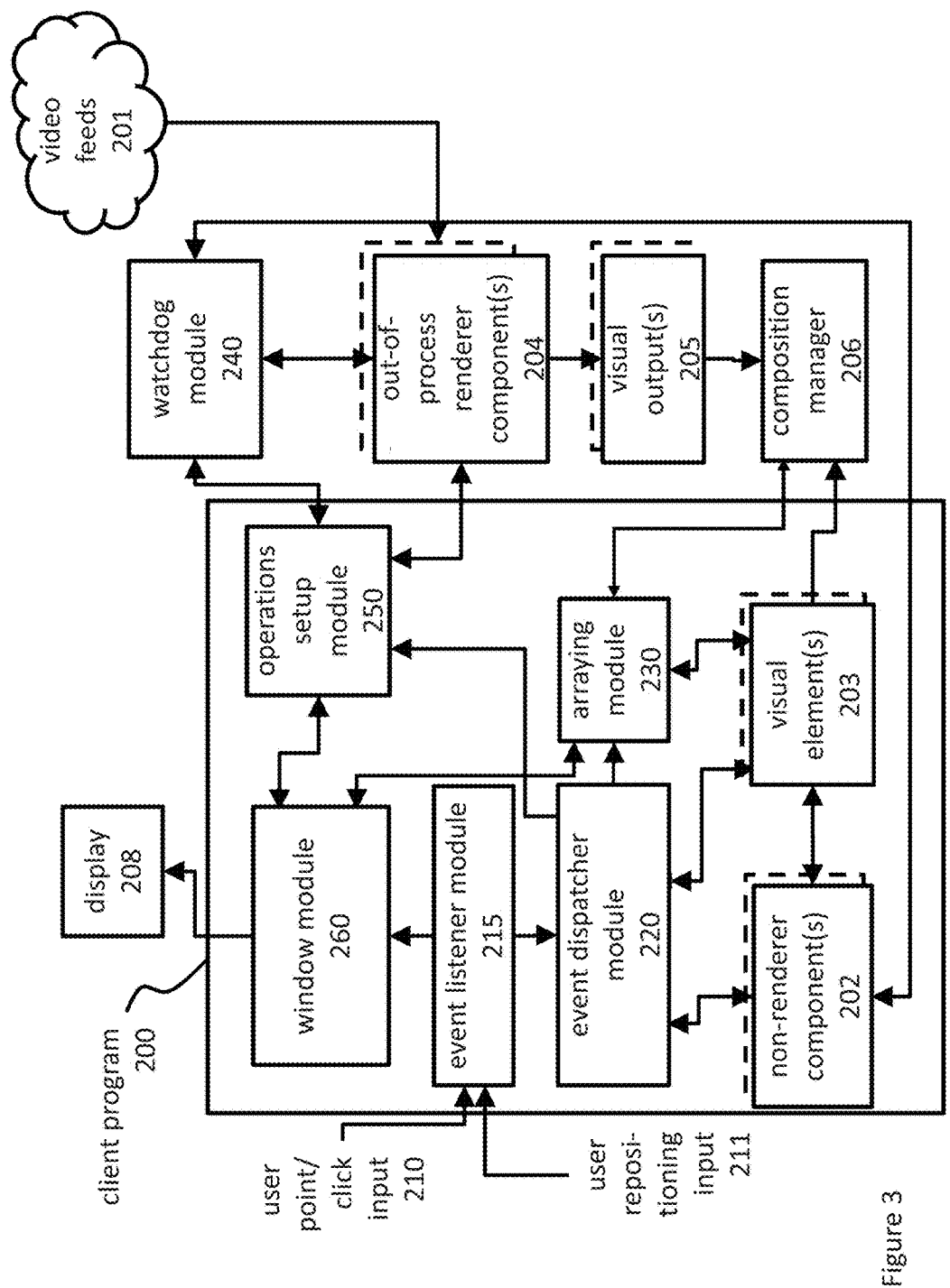
FIG. 3 shows a structural layout and interconnections view of the various modules comprising an embodiment of the client program, including external components operating in another process or execution thread.

With reference to FIG. 3, embodiments typically involve the presentation, on an electronic visual display 208, of several video feeds 201 received from security cameras 401 or other imaging sources. The video monitoring client system of which various embodiments are described herein typically accepts user input 210, 211 for controlling aspects of the display of said feeds 201.

Embodiments of the present security video monitoring client system contemplated herein may be implemented and/or deployed on one or several computers, monitoring workstations, and/or homologous processors. Likewise, embodiments comprise the modules enumerated herein and whose operation and interoperation will be described in greater detail in the various sections.

The description below is intended to non-limitingly illustrate various embodiments of the present invention.

Input and Event Listener Module

In various embodiments of the present invention, the event listener module 215 receives directions from one or more human users who may view video feeds 201 through an electronic visual display 208. Said display 208 may in various embodiments be a liquid crystal display, a TV screen or computer monitor. In other embodiments, an input source, such as a mouse, a touch screen, or other technology implementing some other human input 210 device, may be integrated to or separate from said electronic visual display. In another embodiment, the event listener module 215 may be partially implemented across multiple modules, including those further described herein, such as partially in a visual element 203 of a non-renderer component 202 (such as a GUI playback interface element) on a([n] especially tactile) display 208 and/or partially within the client program 200 itself.

Instructions received from one or more human users are issued to embodiments. Accordingly, in various embodiments, the event listener module 215 receives two broad categories of human instructions. One category of said instructions consists of user point/click input 210 (typically for selecting a specific visual element 203 belonging to a specific tile), whereas another category is user repositioning input 211 (such as for specifying the dimensions or any other attribute of a tile, of the window parent, or of the disposition of a tile). A human-supplied instruction may comprise one or both of 210 and 211.

User point/click input 210 refers to interactions with the video monitoring client system that consist of using a human interface device, such as a pointing device which a human user may physically manipulate, to specify positions within the window parent of said video monitoring client. In an embodiment, these positions may consist of (x,y) coordinates of a correspondingly two-dimensional parent window (further described herein) comprising an embodiment of the client program 200, 260.

User repositioning input 210 may be further distinguished as two types of interactions. Repositioning may refer to an allocation (or reallocation) action wherein the tile location that a feed should occupy and within which said feed should be displayed is specified (or alternatively, re-specified or reassigned) by a user. This is distinguished from repositioning which may involve moving the location of said parent window structure about the electronic visual display 208 on which it is shown. In some embodiments, this window moving may be accomplished in a drag and drop-like operation using a human interface device. In a further embodiment, additional instructions—whether of the foregoing types of different types entirely—may be communicated by a user to the client's parent window for additional purposes. As a non-limiting example, the purpose of said additional instructions may be to access and/or control GUI elements such as windows, ribbons, menu bars or other menus of said windows. It will be further appreciated that additional input instructions may likewise specify configuration and/or settings-related information relative to any aspect of an embodiment of the invention described herein. In a further embodiment, additional instructions may likewise be received to resize or otherwise modify the size of the parent window client.

In a further embodiment still, a scrolling capability may be present to allow one or more users to navigate left, right, up, or down when the size of the window parent structure exceeds the visible area of all tiles and related GUI contents. It will be readily appreciated that such a pan and/or scroll feature that would allow one or more users to view the contents of a region of the parent window that lie beyond the given dimensions of said parent window may be desired. In a further embodiment, display panning and/or scrolling indicators may be present to provide human users with location and/or size cues. In a further embodiment, a function and mechanism to scale necessary GUI components to fit within a specified parent window's area may be implemented, as described in the discussion of the window module 260 herein.

In another embodiment, repositioning may include resizing of the window parent structure within the electronic visual display 208 on which it is shown.

Input instructions 210, 211 received are distinguished for their purpose by the event listener module 215. In an embodiment, the event listener module 215 receives said input instructions from one or more human input devices connected to an embodiment of the present invention and identifies said input instructions 210, 211 as being of the user point/click 210 type or either of the repositioning 211 type. Once instructions are thus identified, the event listener module 150 issues the instructions to the event dispatcher module 200 (further described herein).

In another embodiment, the event listener module may listen for mouse clicks, taps, key presses, gestures, or any other events deemed valid, acceptable, or appropriate either as a user point/click input 100 or as a user repositioning input 125. Events not acceptable or inappropriate for handling by the event listener module 150 may be sent to a distinct observer or other event handling system, such as might be provided—in a non-limiting enumeration—by the operating system upon which an embodiment of the present invention executes, to another program, or simply be ignored.

The person skilled in the art will readily appreciate that input devices as intended herein need not be limited to keyboards, mice, or tactile/touch screen technologies, but in certain embodiments may include inputs as might be received from sensing equipment. The skilled person will appreciate that a non-limiting enumeration of such equipment might include cameras 401, microphones, or multimodal sensors. Likewise, three-dimensional actions or gestures (such as the wave of the hand or a director's "cut" gesture), or other sensory inputs, such as might be received via voice command using a microphone, through eye control or by way of one or more recognized gestures may be detected using any one or more sensors or multimodal sensors. In an embodiment of the invention, the event listener module 215 includes a relationship with one or more device drivers of human interface devices which communicate with said embodiment of the present invention. It is contemplated that the implementation of such user interface component support can be implemented in such manner as to allow a user click, tap or other suitable selection specified upon a parent window structure 270 to be transmitted to the appropriate visual element 203. Furthermore, the foregoing dynamic can be implemented in one, two, or more distinct processes. In another implementation, a series of out-of-process renderer components 204 and/or corresponding visual outputs 205 potentially having no superjacent transparent window can be configured to receive and forward user input 210 to a parent process of the window module 260 or the semi-transparent window parent structure 270, or even to an appropriate target visual element 203.

Input instructions received by the event listener module 215 may be intended to ultimately control an aspect of any one or more of the modules of the client 200, various embodiments of which are described herein, or for other entities auxiliary to it.

Event Dispatcher Module

The input instructions received as events 210, 211 by the event listener module 215 are, in an embodiment, issued to the event dispatcher module 220. Said dispatcher module 220 processes said input instructions 210, 211 to identify the ultimate module and component to which to transmit a specific instruction. In a series of embodiments, the event dispatcher module accepts user input 210, 211 for one or more specific positions the parent window structure 270, further described herein, and accordingly dispatches corresponding commands to various modules located both inside and outside the client program 200, including to out-of-process components 204 whose corresponding visual output 205 occupies a given tiled 280 area within said window parent structure 270.

Mechanisms or schemes by which to identify the module(s) to which to direct input instructions received by the event listener 215 (e.g. whether to one or more modules within the client program 200 or to one or more modules auxiliary or external to it) may vary. In an embodiment of the present invention, the event dispatcher module 220 is provided with information regarding the position of various software objects, GUI elements, and components that occupy the various regions of the window parent structure module. Such information on relative position within the parent window structure or within one or more desktops on which the present invention executes may in various embodiments be inquired by the event dispatcher module 220 and received from the various modules such as the window module 260 present within said embodiments and further described herein, or from the operating system itself.

In an embodiment, the module to which said instructions are intended may be identified by virtue of the human input device from which said instructions are received. This identification method can be simplified in embodiments where a human interface device type provides instructions intended exclusively for a single module within ones of said embodiments.

In the course of its operation, the event dispatcher module 220 can implement various synchronization schemes to properly govern its communication with various target modules described further herein. In an embodiment, such communication is necessary to determine the state of operation and/or readiness of such a target module to receive the information issued by the event dispatcher module 220. This is further useful in any determination and assignment of priority, which in an embodiment, the event dispatcher module 220 may likewise assess and determine. Such assessment may be made in light of conditions both within the client program 200 and outside of it, namely within the computer system on which said program 200 operates. Such synchronization and control, it will be appreciated, ensures that multiple instructions received by the event listener module 215 will be routed to the correct target module to which each is intended. In addition, it will be appreciated that said routing may further include the participation and interaction with additional modules not necessarily described herein and not necessarily a part of the client program 200. Likewise, said additional modules may be located external to the client program 200. Both the physical location and the organizational division of their respective tasks and operation is contemplated as potentially occurring on any one or more computers. Said operation is likewise contemplated as occurring irrespective of the relationship between or among of said computers, including without limitation the network topology by which they may be interconnected.

In embodiments, conversion of input instructions by the event dispatcher module 220 into commands intelligible to the various modules for which they are intended may be supplemented by a mechanism to manage the issuance of said commands to said various modules. Accordingly, in some embodiments of the present invention, the event dispatcher module 220 comprises a synchronization engine whose functionalities include querying various destination modules present within said embodiments, said modules either expected or expecting to accept input instructions. In certain embodiments, said synchronization engine includes a structure to assign priority and control of the issuance, flow, and routing of commands. Accordingly, in certain further embodiments, said synchronization engine coordinates with the event dispatcher module 220 more broadly to transmit commands to modules directly; in other embodiments, the issuance of commands is done with the participation of one or more operating system components. In another embodiment, the coordination of said commands may be undertaken by various appropriate schemes. Such schemes include, without limitation, implementing a command queue, synchronizing the issuance of commands with the operation of other modules within an embodiment of the invention, and assigning a priority policy to specific commands or command types. Command issuance, operation, and communication between the event dispatcher module 220 and other modules within an embodiment may be implemented using either a synchronous or asynchronous communication protocol, or a combination thereof. Likewise, any message passing mechanism, scheme, interface, standard, or protocol may be contemplated for such communication, and be appropriately suited to a specific embodiment. Moreover, any additional structure, such as a message or event queue coupled with any other mechanism to assign priority (e.g. when multiple commands are received within a short interval) and/or control may be likewise contemplated and implemented for purposes of properly directing input information received from the event listener module 215 to any one or more intended target module.

In embodiments, any one or more modules may in practice receive commands issued by the event dispatcher module 220. Such modules may include any one or more of the modules described in various detail herein, likewise, additional modules specific to one or more other embodiments may be configured to receive such commands as well. In particular, the out-of-process renderer 204 and non-renderer 202 components modules, further discussed herein, may in some embodiments receive such commands from the event dispatcher module 220 directly. This may particularly be the case in instances where the command to forward from the dispatcher 220 does not require any specific intervention from, or modification or handling by, the operations setup module 250, further described herein. In another embodiment, commands issued by the event dispatcher module 220 may be first sent to the operations setup module 250 and thence to any one or more out-of-process renderer components 204. This may be particularly desirable or even necessary in embodiments where the setup module 250 must interpret commands that it receives from the event dispatcher module 220 in light of other operational constraints, requirements, or reality. Commands issued from the event dispatcher module 220 to out of process renderer components 204 include image- or video-level configuration instructions to said components 204 that specify part or all of the latter's functionality. In another embodiment, commands issued by the event dispatcher module 220 may specify explicit instructions on assigning one or more out-of-process renderer components 204 to one or more video feeds 201. It will be appreciated that in embodiments where direct communication between the event dispatcher module 220 and any one or more out-of-processor components 204 exists, a command structure separate from that discussed herein for the operations setup module 250 may be provided. Accordingly, said separate command structure may be provided within the event dispatcher module 220 or within one or more out-of-process renderer components 204 present to ensure that input received by the event dispatcher module 220 from the event listener module 215 is properly and ultimately converted to intelligible commands for use by the out-of-process renderer components 204. Likewise, in a further embodiment, namely one in which a dispatcher module 220, an operations setup module 250, and one or more out-of-process renderer components 204 are present, portions of the command generation process may be shared amongst all three module types before the out-of-process renderer component(s) 204 may in turn respond to said command. It will be appreciated that any appropriate communication protocol and/or message passing scheme between the aforementioned modules 220, 204 may be contemplated and implemented, and that no explicit constraint is contemplated as to the number or variety of connections contemplated in this regard. Likewise, in embodiments where the operations setup module 250 is present, a successive or staged encapsulation mechanism may be envisioned, in which information issued by the event dispatcher module 220 to the operations setup module 250 is interpreted or otherwise fortified by the latter with additional information before being converted into a command for the intended out-of-process renderer component 204 and eventually issued to the latter.

While significant discussion thus far has been directed toward communication between the event dispatcher module 220 and the operations setup module 250 and out-of-process renderer components 204, it will be readily apparent that input information received by the event dispatcher module 220 must likewise be transferred as commands to various other key modules, including, non-limitingly, to such modules as the non-renderer components 202, visual elements 203, arraying module 203, all of whose operations will be further described herein.

In particular, the issuing of instructions directly to non-renderer components 202 and to visual elements 203 (or to the latter by way of non-renderer components 202) may be further appreciated as being important in driving user interaction of the client program 200. This is namely due to the nature and role of the visual elements 203 as being a principal point of contact and control between users and embodiments of the client program 200. Individual discussion of, as well as the relationships between visual elements 203 and non-renderer components 202 is provided in subsequent sections herein. Irrespective of whether the event dispatcher module 220 accepts input 210, 211 for which it 220 provides immediate conversion to a single or complete command, it will likewise be appreciated that in an embodiment, the setup module 250 or the window module 260 may likewise receive output from the event dispatcher module. While the latter two modules will be discussed in greater detail herein, their reception, whether of instructions or commands from the event dispatcher module 220, is important in the conversion of user input in important interface-related tasks such as issuing changing the dimensions of said the window parent structure in which embodiments run.

In another embodiment, the event dispatcher module 220 may be partially implemented within one or more visual elements 203, further discussed herein. This may be desirable, for example, in cases where a visual element 203 is a user interface control configured to receive to receive user input 210, 211 to control the operation of the client program 200. Alternatively, the event dispatcher module 220 may conversely issue commands to a non-renderer component 202, which in turn directs a corresponding visual element 203, thus indirectly controlling visual element 203 from the dispatcher module 220. A non-limiting example of the latter operation may occur in cases where the visual element 203 is a digital on-screen graphic (such as a logo, information mark, or icon appearing at a corner of a tile) or a motion graphic (including a 3D or other animation to be superposed or overlaid—as further discussed herein—atop the visual output 205 resulting from the work of one or more out-of-process renderer components 204).

Additionally, in an embodiment, the event dispatcher module 220 accepts input 210, 211 that it 220 interprets into instructions or commands for directing the operation of the arraying module 230. In a non-limiting enumeration, such commands may include user instructions for the intended positioning, layout, and configuration within the window module 260 of the various feeds 201 received.

It will be further appreciated that the interpretation or conversion of user input 210 to instructions or commands may be done entirely by the event dispatcher module 220 as discussed for various embodiments herein, or be complemented to any degree by interaction with other components, including modules of operating systems upon which embodiments execute.

In a further embodiment, the event dispatcher module 220 further comprises one or more suitable control structures (such as a semaphore or a priority queue) to ensure that the various commands that it converts and dispatches to other modules are issued in accordance with an appropriate priority policy.

OOP Software Renderers and Visual Outputs

As discussed herein, embodiments receive video feeds 201 from cameras 401 or other signal sources outside the client program 200. Embodiments typically receive feeds which must be decoded and rendered to be intelligible to be used by embodiments and to convey information useful for human users. In a manner analogous to the paradigm described herein for non-renderer components 202 and visual elements 203, namely wherein the latter constitutes the visual result (or realized output) of the former, the out-of-process renderer components 204 perform the rendering and decoding tasks upon received video feeds, while the visual outputs 205 correspond to the video feeds' 201 stream once decoded and rendered.

Consistent with its name, an out of process renderer component 204 is, in embodiments, located and made to execute in a process external to the one corresponding to the client program 200. It will be appreciated that such a configuration mitigates the serious performance pitfalls likely to occur when a sizable number of feeds would simultaneously require rendering, potentially slowing down the performance of said client program 200.

The operations setup module 250 instantiates an out-of-process renderer component 204 upon receiving a command to do so by the event dispatcher module 220. Such a command is typically issued by the latter 220 further to the receipt of an event 215 in the form of user input 210, 211 to this effect, as a GUI-based selection or other issued command by a human user within a part of the client program 200. In the course of initialization, the operations setup module 250 matches the video feed 201 requiring rendering with an out of processes renderer component 204 that it selects (using any appropriate decision-making scheme) for decoding and rendering said feed 201. The out of process renderer component 204 carries out its operation in accordance with any additional instruction provided to it (including, without limitation, performance settings and/or other execution parameters) provided by the operations setup module 250, also consistent with user input received initially 210, 211, or with any previously-specified policy.

Figure 7:
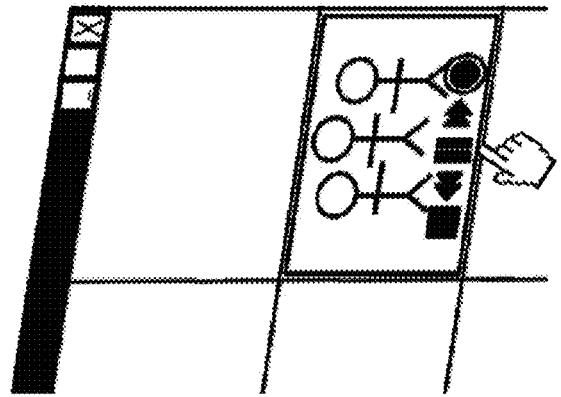
FIG. 7 shows a magnified partial view of an embodiment's program window with emphasis on a single transparent tile comprising with visual elements and visual output composited within a semi-transparent window parent structure.
Figure 6:
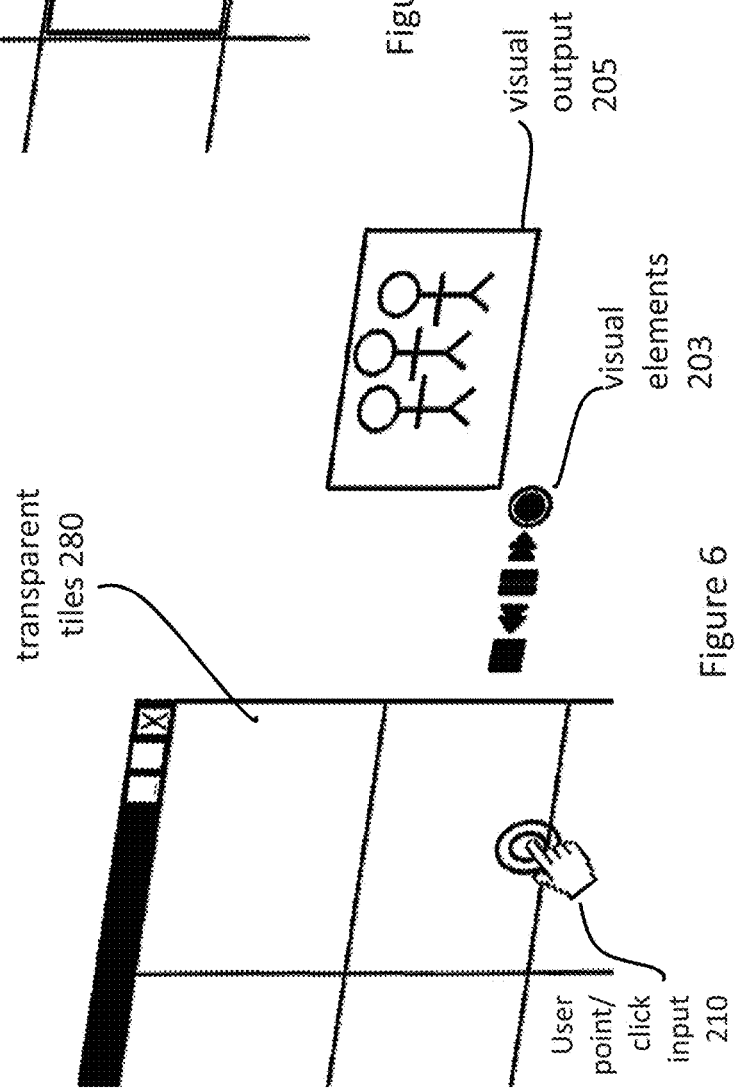
FIG. 6 shows an exploded view of an embodiment's program window receiving a user point-and-click input upon a transparent tile contained within a semi-transparent window parent structure, said window parent structure superjacent to visual elements of non-renderer components, which are in turn superjacent to the visual output of an out-of-process renderer component.

The output of the renderer component 204 is referred to as a visual output 205. In embodiments, the visual output 205 typically corresponds to the image data received from the video feed 201 converted to video stream format and which may be viewed as such on a computer. As mentioned herein, this visual output 205 is subsequently issued to the composition manager 206 for compositing with any one or more corresponding visual elements 203 intended to be superjacently aligned with said visual output 205 (FIG. 4*a*, FIG. 6, FIG. 7).

In another embodiment, the arraying module 230 may issue instructions to an out-of-process renderer component 204, to its visual output 205, and/or to the composition manager 206 instructions on positioning within the window parent structure 270 and/or z-order hierarchy of the visual output 205 and visual elements 203 to cause the visual elements 203 result u (discussed herein) to be displayed subjacently to the transparent tiles 280 occupying the semi-transparent window parent structure 270 but superjacently to said visual outputs 205 (FIG. 4*a*). In another embodiment, direct communication channels (i.e. without intermediary module) may be implemented between visual elements 203 and out-of-process renderer components 204 so that the latter may receive instructions from the former on positioning and relative z-order hierarchy to be subsequently applied. It will be appreciated that a plurality of visual elements 203 superjacent to the visual output 205 can be composed in accordance with a specific order of priority. The foregoing order of priority can in turn determine the z-order that the various visual elements 203 occupy. Such an order of priority can be determined by a pre-specified sequence, or be specified by a human user in the course of operation of an implementation. Nonetheless, the result of such specification can be the establishment of a z-order hierarchy of corresponding visual elements 203. As a result of such a hierarchy, multiple non-renderer components 202 can be combined, and respectively composed above a visual output 205. In implementations, such visual elements 203 and/or non-renderer components 202 can even reside within the client program 200.

In view of the foregoing, it will be appreciated that the semi-transparent window parent structure 270 may be conceived of as both an abstract construct and tangible layer whose purpose is to occupy the highest z-order of any component described herein. As such, user input 210, 211—particularly of a pointing-, tapping-, clicking-, or dragging-like nature, will be first received by the event listener module 215 and subsequently routed to the intended GUI element to be accordingly handled by an underlying software (or hardware) component.

In a manner analogous to the cases further described herein for the non-renderer components 202, the out-of-process renderers' 204 operation (with the appropriate substitutions) is monitored by the watchdog module 240 for anomalous operation. Here again, anomalous operation is to be similarly understood as a widely encompassing concept and term that may refer to any incomplete function, non-function, or performance-related issue. Accordingly, the watchdog module 240 may monitor the execution status of any one or more out-of-process renderer components 204 and following detection of any anomalous operation, restart said component(s) 204. Likewise, the watchdog module 240 may terminate any out-of-process renderer component 204 following detection of any anomalous operation of said component(s) 204.

In a manner analogous to the parameter set described for the non-renderer components 202, and as further discussed herein, the watchdog module 240 may be configured to receive a set of any number of condition parameters to either assert with certainly or alternatively deduce instances in which anomalous of one or more out-of-process renderer components 204 may occur. Upon occurrence of said instances, whether deduced or certain, the watchdog module 240 may inform the operations setup module 250 to issue a command to the window module 260 directing the latter to prompt a human operator with an exception message and the option to restart any one or more anomalously functioning out-of-process renderer component(s) 204. Upon reading said message and prompt(s), a human user may be presented with a "yes" option to restart or "no" option to avoid restarting any one or more out-of-process renderer components 204 having operated anomalously. In another embodiment, a similar set of "yes"/"no" prompts may likewise be offered, but with the option to terminate any one or more out-of-process renderer components 204 having operated anomalously.

It will be appreciated that the execution of out-of-process renderer components 204 outside the client program 200 provides embodiments with an important performance advantage, particularly as the number of video feeds to decode and/or render increases. The execution of such components 204 outside obviates any wait, lag, or delay that would be introduced if rendering were done for an equally large number of feeds 201 within the execution thread of said client program 200. A large number of high-resolution streams may thus be rendered, including with a framerate superior than would be the case if the components' 204 execution were integrated within the client program 200. Similarly, this external thread execution strategy encourages data encapsulation while facilitating the fault isolation component described herein as it shields the client program 200 from undesired effects arising from the termination, restarting, and/or any other corrective or contingent action to be taken as a result of anomalous operation of any one or more out-of-process renderer component.

Window Module

The window module 260 plays an important part in embodiments in its dual role as the recipient of user input 210, 211 as well as the vehicle through which the composited and arrayed result of video feed and non-video feed components is visually laid out for human users. The window module 260 receives events from embodiments of the event listener module 215 which it 260 accordingly uses to direct the behavior of the window parent structure. Likewise, FIG. 3 and FIG. 4a together illustrate the relationships between the window module 260 and the various components, elements, and modules with which it 260 interacts.

Figure 4B:
FIG. 4b shows a screenshot of an example embodiment's window module that implements right-to-left text directionality.

Embodiments may run on computer operating systems configured to support windowing functionality. Accordingly, said windowing functionality may be implemented or configured to support portions of the window, icon, menu, and pointer paradigm known in the art. In further embodiments, the window module 260 implements a main window of the client program 200 in which the principal content to be displayed is laid out, consistent with instructions received from the arraying module 230, further described herein. In embodiments, the window module 260 may also provide scaling functionality so that various interface components may be displayed at different pixel densities. The window module 260 may likewise provide additional conversion capabilities as to allow various GUI features and visual elements to be displayed using the traditional coordinates and directionality expected in right-to-left (RTL) languages as shown in FIG. 4b.

Figure 5B:
FIG. 5b shows a screenshot of the panes, popups, and other GUI features and visual elements that in an example embodiment may appear together with the semi-transparent window parent structure and array of transparent tiles, some of said GUI features and visual elements appearing superjacent to video feeds.

In its framework role in many embodiments, the window module is configured to implement a semi-transparent window parent structure 270. The window parent structure 270 occupies an important part of the display 208 on which embodiments run, and furthermore comprises any number of standard window GUI elements, such as menus, ribbons, and buttons with which a human user may interact, in addition to text and notification areas. A sketch showing the contextual relationship of the foregoing parent structure 270 with elements to which it relates will be discussed presently and is shown in FIG. 5a. Accordingly, a screenshot depicting a possible layout for the foregoing is shown in FIG. 5b.

An important feature of the window parent structure 270 is the presence of an array of transparent tiles 280, whose nature will be described shortly. The number of transparent tiles 280 may vary among embodiments; alternatively, it may be a settable parameter within a given embodiment. In the latter case, the tile count parameter may be specified 210, 211 by a user to the event listener module 215, which accordingly dispatches the input in accordance with said parameter setting to the event dispatcher module 220, ultimately directing the arraying module 230 to lay out said number of transparent tiles in preparation for content. The specific disposition of said tiles may be hardcoded or alternatively specified by way of a further parameter or group of parameters, preferably contained and managed within the arraying module 230, although in another embodiment, such parameter settings on tile disposition may be contained or otherwise managed in any one or more modules deemed appropriate. The window module 260 is said to implement a semi-transparent window parent structure 270 over at least a portion of the total window area that it 260 covers. The notion of semi-transparency here may be understood to accurate for either of two reasons; namely, because a portion of said structure 270 is transparent and another portion not, or because the entirety of said structure is partially transparent, allowing (potentially multiple) content layers for transparent tiles 280 to be defined and with which to be interacted. In an embodiment, the semi-transparent window parent structure may occupy a rectangular region within the output of the window module 260. In a further embodiment, the precise area of the parent structure may be specifiable and/or modifiable parameter in a manner similar to that discussed for the number and disposition of tiles 280. Although the window parent structure 270 may be thought of canonically as a rectangular area defining the client program 200, in a still further embodiment, no specific constraint on the shape of said parent structure 270 need exist.

In this context, a transparent tile 280 is a delimited constituent portion of a semi-transparent window parent structure 270. Said tile 280 is likewise said to define a wholly or partially transparent region comprising the composited contents of a visual output 205 and the latter's attendant visual elements 203 disposed in accordance with a specific logical superposition ordering or hierarchy. In a manner similar to the window parent structure 270 described previously, the transparent tile 280 may be thought of canonically as a rectangular area within the window parent structure 270; accordingly, in another embodiment, no specific constraint on the shape of said parent structure 270 need exist. In yet another embodiment, no constraint on the number of visual elements 203 and visual outputs 205 need exist.

A tile 280 may be entirely transparent, or alternatively specify opaque regions, such as to accommodate one or more visual elements 203, such as a clock displaying the time, elapsed playing time, borders, or other interface controls as further described herein. A specific z-ordering or overlapping hierarchy is generally enforced, in which various visual elements 203 and visual outputs 205 are typically made to line up with specific (x,y) positions behind or below a tile. In embodiments, such alignment may be accomplished by way of a command issued to any one or more of the operating system on which the client program 200 runs, the non-renderer components 202, or the out-of-process renderer components 204, or alternatively by the combined efforts of the composition manager 206 and the arraying module 230. In another embodiment, said alignment may be partially implemented by way of interaction with another module.

It will be appreciated that functionality may be implemented by which to scale necessary visual elements 203 to fit within a tile 208 so that said tile 208 may in turn adequately fit within a specified window parent's 270 area. Likewise, the window parent structure may in another embodiment be configured to variously accept user input 210, 211 to change its dimensions or be otherwise resized, with a series of parameters stored or being set within any one or more of the arraying module 230, window module 260, or any other location. In another embodiment, resizing of either transparent tiles 280 and/or the semi-transparent window parent structure 270 within a display 208 may also be managed dynamically, such as when the window parent 270 is expanded to fill the entirety of a display 208. Likewise, the window module 260 can accept user instructions, such as might be received from the event listener module 215, to allow the window parent structure 270 itself to be resized, whether said resizing operates to cause said window parent 270 to fill the entire display 208 on which said parent 270 is output, be returned to a former dimension, or be provided an entirely different set of dimensions. Said resizing is implemented by any combination of the arraying module 230, further discussed herein, operating in tandem with window handling functionality provided by the operating system. It will be appreciated that the degree to which said resizing of the window module 260 output and specifically the window parent structure 270 is provided by either the arraying module 230 itself or the operating system, or to any specific proportion of the latter two entities, may be subject to variation.

It will be appreciated that in an embodiment, the semi-transparent window parent 270 may be a window, or alternatively incorporated within a window. It will be further appreciated that in said embodiment, a user may resize said semi-transparent window parent 270 by resizing the window to which it 270 corresponds, or in which it is contained. It will be still further appreciated that said window may additionally include widgets, ribbons, and menus. User input 210, 211 is likewise received at or by said parent window 270.

In another embodiment, a change in size of the window parent 270 may be coordinated in such manner as to accordingly and proportionally change the dimensions of any and all tiles 280 that it contains. Thus, the relative aspect ratios of both the window parent 270 and each of the tiles 280 may be maintained irrespective of any resizing operations. In a further embodiment, the visual output 205 content within each tile 280 may likewise be scaled in proportion with the change in dimensions of each tile 280, likewise in relation to the change in dimension of the window parent 270. In embodiments in which the visual output 205 does not scale in proportion with the change in dimensions of its corresponding tile 280, additional interface elements, such as pan and scroll bars may be provided to assist and guide human users. It will be appreciated that said additional interface elements need not be constrained or be otherwise specific to a single area, such as about each tile 280, on or near the window parent structure 270, on any part of the window module 260 output to the display, or even external to the client program.

With reference to FIG. 6, human user input 210 may be received for a specific position within a window parent 270 structure; in a further embodiment, said input 210 may relatedly be intended to actuate any one or more visual elements 203 within a specific tile 280. In an embodiment, said input 210 is received for a specific (x,y) coordinates of the semi-transparent window structure 270, with said coordinates being received by any combination of the event listener module 215 and the operating system's window handling system, converted into a command, and ultimately issued to the intended non-renderer component 202 and/or out-of-process renderer component 204, as required.

In another embodiment, the watchdog module 240, further described herein, monitors the operation of the out-of-process renderer components 204. In a still further embodiment, the watchdog module 240 performs similar monitoring of the non-renderer components 202. Upon said watchdog module's 240 detection of anomalous operation of either type of component 202, 204, the window module notifies the operations setup module 250 (further described herein) by way of any appropriate message passing mechanism. In turn, the operations setup module 250 accordingly issues a notification signal to this effect to the window module 260, which accordingly issues a specific exception notification message to be presented to the human user. In an embodiment, said notification message is presented on the display 208. It will be appreciated that the window module's 260 presentation of said notification message need not be constrained to any single type, wording, or form, and may provide any level of detail, such as which component operated anomalously, and the severity thereof being non-limiting examples. Likewise, it will be appreciated that the aforementioned notification issued by the window module 260 may vary to include any one or more of a popup message window (whether separate or incorporated within said semi-transparent window parent structure 270), a change in color to any one or more interface elements, or any other visual indicator. In a further embodiment, a non-visual indicator may accompany the latter visual notification, or be independent therefrom. Said notifications may likewise be issued remotely, such as through a network and which may be delivered to one or more recipients, in a non-limiting enumeration, via email, text message, or other alert. In another embodiment, said message may likewise provide a series of options with which to proceed, such as whether to terminate or restart the anomalous component(s), or to proceed by taking any additional measures.

The hierarchical implementation of a semi-transparent window parent structure 270, the latter receiving the highest z-order ranking is imparted, forms the basis of the desired performance enhancements delivered by embodiments discussed herein. The next-highest z-order is occupied by visual elements 203 and the next highest by the visual outputs 205 of out-of-process renderer components 204. This hierarchical layering, which combines especially the out-of-process operation of renderer components 204, in addition to the composition capabilities resulting from the work of the composition manager 206 (afforded, in embodiments, to varying degrees by the operating system), results in significant performance enhancements. Such performance enhancements are possible because the structural interconnections disclosed herein between the semi-transparent window structure 270, composition manager 206, and out-of-process renderer 204 and non-renderer 202 components implement a low-resource client program 200 while maximizing the capabilities of the most processing-intensive components of the system. Doing so alleviates many performance-related shortcomings, while minimizing the fault isolation shortcomings which are clearly identifiable (and options for corrective action) presented to users.

Arraying Module

The arraying module 230 receives commands from the event dispatcher module 220, visual elements 203, and composition manager 206 that it uses to configure, position, and dimension visual outputs 205 resulting from any one or more out-of-process renderer components 204 instantiated, initialized, and made operational within the client program 200. The composition manager 206 composites visual elements 203 of non-renderer components 202 with the visual outputs 205. The latter visual outputs 205 typically correspond to scenes 402 converted into video feeds 201 by capture devices 401, and are the processing output of from out-of-process renderer components 204. The arraying module 230 configures outputs received from the composition manager 206, typically as the combined integral content (consisting of visual output 205 and all visual elements 203) to be forwarded to the window module 260 using any communication protocol and displayed within a space corresponding to the dimensions of a single tile 280 occupying a portion within the semi-transparent window parent structure 270.

It will be appreciated that various interactions involving the arraying module 230 are described in the sections detailing the function of various other modules herein; to avoid repeating them all in this section, the reader may consult said sections for additional details on this module 230.

In embodiments, the arraying module 230 forwards commands to the window module 260 specifying the positioning of various visual elements 203 corresponding to multiple tiles 280 to occupy a z-order placing said visual elements 203, when appropriate, atop or otherwise superjacent to the visual outputs 205 to be specified to occupy any one or more tiles. In another embodiment, such forwarded commands may be subject to temporary delay as portions of tasks intended for prior completion by the composition manager 206 further described herein are carried out by the latter. In some embodiments, said tasks, and related forwarded commands, may be forwarded to the operating system upon which the client program 200 executes. This may be necessary in cases where the composition manager 206 functionality is provided in whole or in part by the operating system.

Information on which tile 280 slot within the window parent structure 270 need be occupied by the output of the composition manager 206 (typically a combination comprising a visual output 205, in various embodiments disposed subjacent to any one or more visual elements 203). It will be appreciated that for those tiles 280 on which no visual element 203 has been specified (or need be present), the arraying module 230 issues positioning instructions to the window module 260 on which tile 280 slot within the semi-transparent window parent structure 270 the corresponding visual output 205 alone need be placed. Much more rarely, visual elements 203 to be disposed within one or more tiles 280 (but without a corresponding visual output 205) may in another embodiment be issued to the composition manager 206 and then to the arraying module 230 for disposition within the parent structure 270.

In embodiments, the arraying module is configured to not only impart a relative position to the individual outputs resulting from the composition manager 206 by forwarding positioning information to the window module 260, but to also cooperate with the latter modules 206, 260 to enforce relative z-order hierarchy (i.e. superjacency/subjacency) of the content resulting 203, 205 from the various renderer 204 and non-renderer components 202 specified, instantiated, and initialized for each of various tiles in various use cases of the client program 200. In further embodiments, the arraying module 230 issues instructions to the window module—a portion or all of whose positioning duties may be implemented by the operating system—to display visual elements 203 and/or visual outputs 205 subjacently. In still further embodiments, instructions to display visual elements 203 superjacently to said visual outputs 205 may be further issued by the arraying module 230 to the windowing module 260 for this purpose.

In another embodiment, the arraying module may receive user input 210, 211 from the event listener module 215 by way of the event dispatcher module 220 for changing the dimensions of said semi-transparent window parent structure, and/or any window resulting from window module 260 output. In a further embodiment, said instructions may be received and for causing the semi-transparent window parent structure 270 to be re-dimensioned in accordance with received user input 210, 211, which may non-limitingly consist of a drag-to-expand, drag-to-shrink, or textual specification of dimensions by a user.

In a still further embodiment, and as further described herein, the arraying module 230 may change the dimensions of a window parent 270, with the tiles 280 contained the latter 270 automatically changing in proportion with the change in dimension. In a yet further embodiment, the scaling of visual element 203 and/or visual output 205 content in one or more tiles 280 within the window parent 270 may likewise be scaled to the new dimensions specified.

Composition Manager

As disclosed herein, the composition manager 206 is a component—and typically functionality offered and/or managed by the operating system—to perform window compositing. In another embodiment, a composition manager 206 may likewise include processing functionality such as scaling, rotation, and warping. In a still further embodiment, each visual output 205 or tile 208 may have a composition manager of its own. In yet a further embodiment, composition may be managed by one or more operating system components. Thus, a composition manager 206 may be appreciated as a sort of abstraction for any of severally located system- or operating system-level services to perform the aforementioned compositing and other functionalities.

It will be appreciated that in various contexts, composition as a term may refer to the related notions of establishing the value, color, and intensity of pixels as a function of the various logical structures said pixels collectively depict. Relatedly, the term may also refer to the stacking or superposing of various controls atop one another. In embodiments contemplated herein, the notion of composition should be appreciated as a mixed-mode mixture of immediate and retained mode composition.

As disclosed in various sections herein, the composition manager 206 receives as inputs any one or more visual outputs 205 and/or any one or more visual elements 203 and respectively composites them, typically superposing the latter atop the former, to visually create the illusion that both are truly aspect of the same scene. The composition manager 206 then issues the composited tile content as it should appear at its intended tile 280 slot within the semi-transparent window parent 270 once displayed 208.

Certain operating systems allow each process to perform its own composition tasks within the framework of said operating system. Increasingly, the operating system allows client applications to access the hardware capabilities of graphics cards present within a computer to perform such composition duties. Thus, the client program 200 need not necessarily rely on computer processor cycles to perform the composition; in combination with out-of-process thread execution notions discussed herein, such offloading to specialized hardware allows significantly improved performance targets to be met. Such performance improvements are valuable in light of the higher resolution images (e.g. 4 k) becoming increasingly commonplace, as they do not slow down the client program nor limit the number of video feeds 201 to be rendered 204 to merely the number possible.

It will be appreciated that the composited 206 tiles 280 disposed within the semi-transparent window parent structure are intended to provide the relative appearance and operation of said components into a single seemingly integrated GUI experience as seen from the perspective of a human user.

Software Non-Rendering Components and Visual Elements

Figure 8:
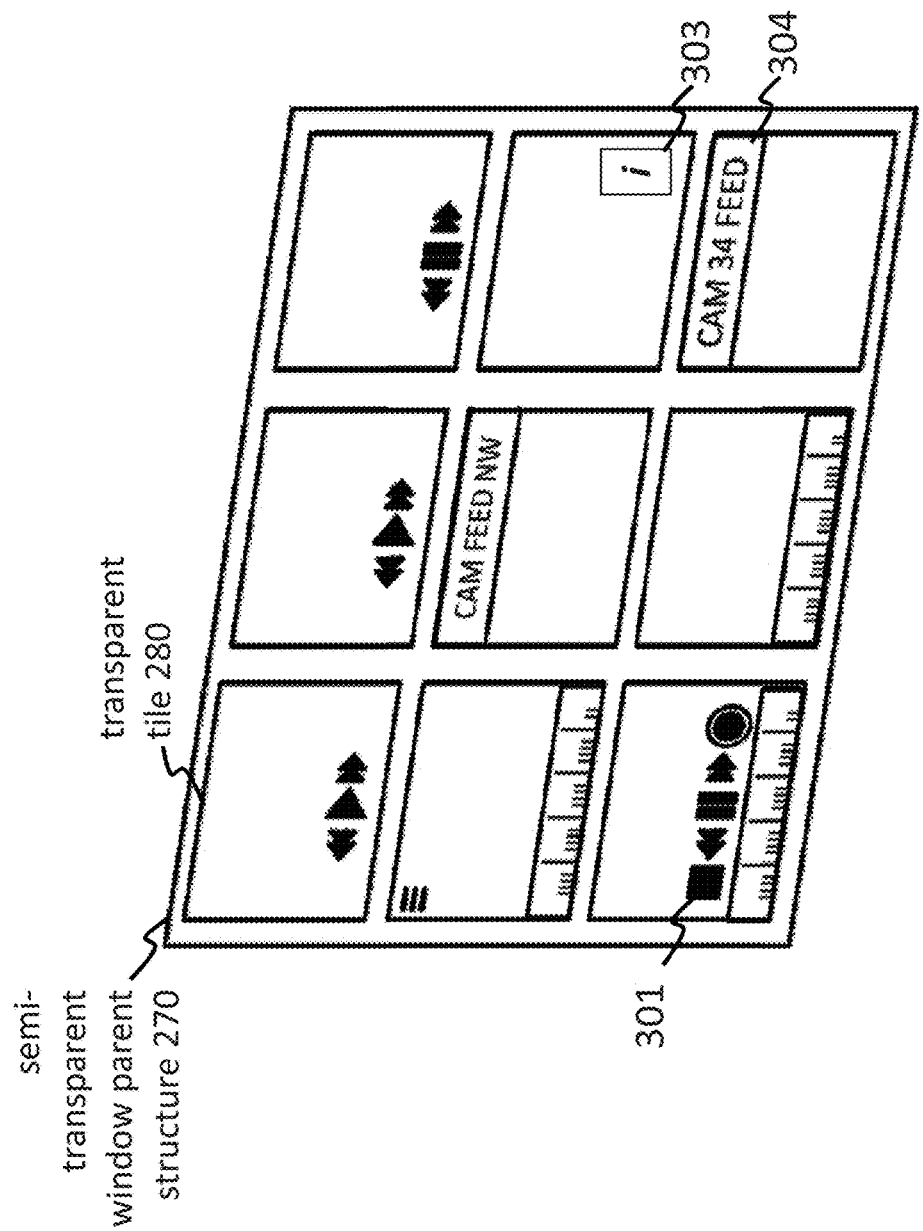
FIG. 8 shows an example depiction of an array of transparent tiles disposed within a semi-transparent window parent structure, with many of said transparent tiles containing various non-renderer components' visual elements superposed.

Software non-renderer components 202 play an important role in embodiments described herein. While renderer components 204 ensure that video feeds 201 are converted into equivalent visual outputs 205 for compositing 206, arraying, and ultimately for presentation by the window module 260, in embodiments, non-renderer components 202 and their associated visual elements 203 implement software controls that typically provide human users with components with which said users may interact, typically by supplying user input 210, 211 as discussed herein (FIG. 8). Alternatively, non-renderer components 202 may have as their respective visual elements 203 far less interactive components. Users may accordingly interact less or not at all with the latter variants.

A typical example of non-renderer components 202 as contemplated for embodiments and which may be considered to be in the interactive category non-limitingly include ActiveX components. Such components 202 provide for the creation, as their corresponding visual elements 203, of software objects which users may interact, typically by way of a user input 210, 211 further discussed herein. Such software objects may include pictographic visual elements (e.g. resembling media controls 301, video progress bars 302) and implement corresponding functionality. In other cases, A set of visual elements 205 an ActiveX control (i.e. non-renderer component 202) that implements a more comprehensive functionality—such as an entire player—may for example be implemented.

Non-renderer components 202 considered to be in the less interactive category may likewise be contemplated for embodiments. These components 202, as deployed within one or more transparent tiles 280, are referred to as visual elements 203 of the same 280. Examples of visual elements may non-limitingly include digital on-screen graphics, such as a logo, icon 304, or information mark 303, appearing within a part of or at a corner of a tile 280. Other examples of visual elements non-limitingly include motion graphics, such as an animated variant of an on-screen graphic, including a 3D image, textual animation, or a moving annotation such as contour tracking of a specific target. Where functionally appropriate, non-renderer components 202 may further interact with or be supplied with data by one or more external sources, such as an image processing application.

In a manner akin to the case of out-of-process renderer components 204, further described herein and whose execution is desired to occur outside the process of the client program 200, non-renderer components 202 and their associated visual elements 203 are likewise optimally desired to operate out of process for similar reasons (i.e. to obtain similar benefits and avoid similar disadvantages).

In another embodiment, renderer components 202 may execute within the same process as the client program 200. In a further series of embodiments, the corresponding visual elements 203 may likewise be specified to run in any one of the same process as the client program, the same process as one or more out-of-process renderer components, or an entirely separate process altogether. It will be appreciated that the execution process within which one or more non-renderer components 202 may execute may be determined based on the specific nature, function, and/or operation of the non-renderer component 202 and/or its corresponding visual element 203 itself.

It will be appreciated that the degree to which each of these visual elements 203 (and their corresponding non-renderer components 202) specified and instantiated for a tile 280 may interact and cooperate with out-of-process renderer components' 204 respective visual outputs 205 varies in accordance with the specific nature of the non-renderer component 202.

Figure 9:
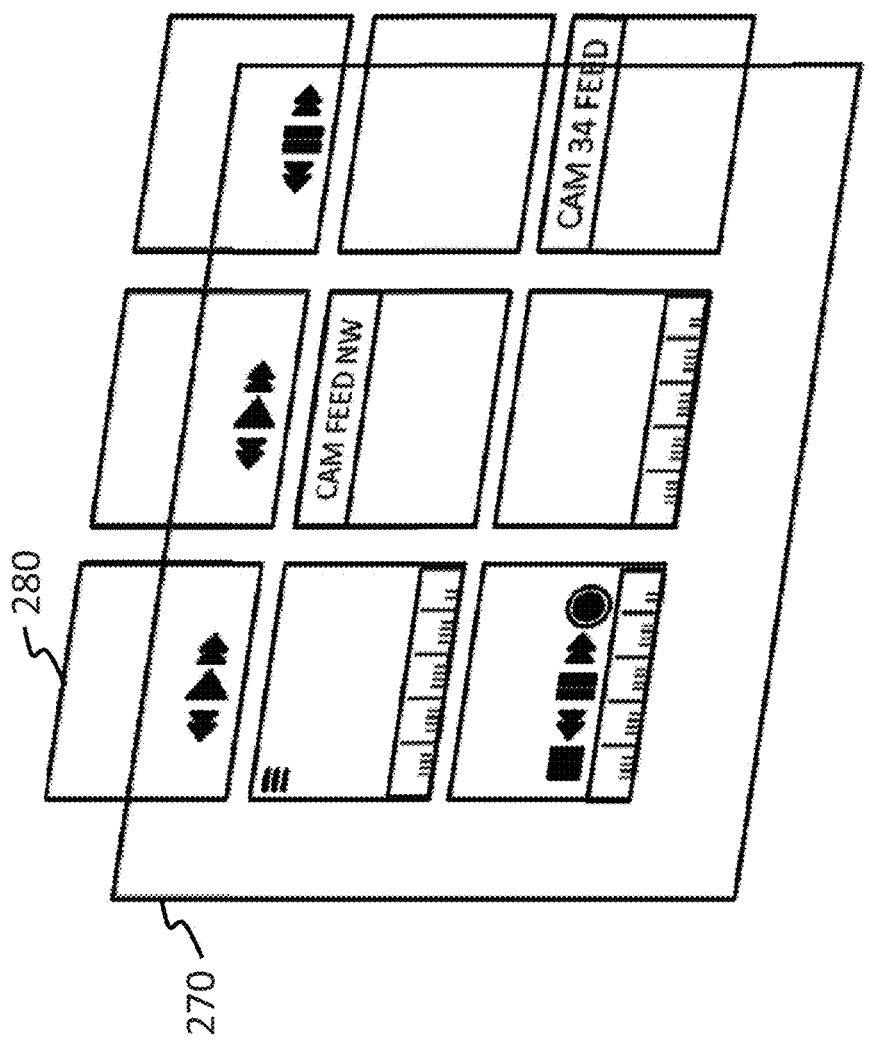
FIG. 9 shows an abstract collaboration between a semi-transparent window parent structure and a series of transparent tiles upon many of which various non-renderer components' visual elements are disposed.

Visual elements 203 of non-renderer components 202 are typically superposed atop the visual outputs 205 of out-of-process renderer components by the composition manager 206, further described herein. For an individual tile 280, a user may specify (for example, from a selectable list or selection menu accessible to the client program 200, or by any other appropriate means) the non-renderer components 202 to instantiate for a specific tile 280. Such selection may be made via any user input 210, 211, with the event listener module 215 issuing instructions to the event dispatcher module 220 to instantiate said non-renderer component 202. Said non-renderer component 202 then initializes any visual element 203 required for said non-renderer component 203 to operate within a tile 280. In an embodiment, the visual element 203 of said component 202 may subsequently communicate with the event dispatcher module 220, which in turn issues notification of the instantiation of said component to the operations setup module 250 to logically couple the newly instantiated no-renderer component 202 with the specific out-of-process render component 204 with which it is intended to cooperate. Thus, a collection of visual elements 203 corresponding to one or more non-renderer components 202 for each individual tile 280 (FIG. 9) may be constructed for cooperation with visual outputs 205 corresponding to rendered 204 variants of feeds. Furthermore, the event dispatcher module 220 may, upon receipt of instructions, typically by way of user input 210, 211 (from the event listener module 215 or a subportion thereof local to one or more visual elements 203), may cause the event dispatcher module 220 to execute commands consistent with the operation of said non-renderer component 202 by issuing instructions, for example to the arraying module 230 or to the operations setup module 250. Instructions issued to the arraying module, may comprise information on specific coordinates within the bounds of a specific tile 280 (or alternatively, within the semi-transparent window structure 270 or any part of any output from the window module 260) at which the visual elements 203 should be disposed. Instructions issued to the operations setup module 250, as described herein, may include information or commands to associate said visual elements 203 with specified non-renderer components, or ensure that no exception or incompatibility between said non-renderer component 202 and out-of-process renderer component 204 intended for a specific tile 280 might exist or otherwise occur. In another embodiment, visual elements 203 corresponding to a non-renderer component 202 and intended for superposition atop the foreground video rendered 204 by a visual output 205 may be shared with the composition manager 206, which carries out compositing tasks to amalgamate all visual elements 203 intended for composition with a visual output 205 for purposes of producing a tile 280 to be issued to the arraying module 230 for later inclusion to the window module 260 and ultimate display 208, further described herein.

Figure 10A:
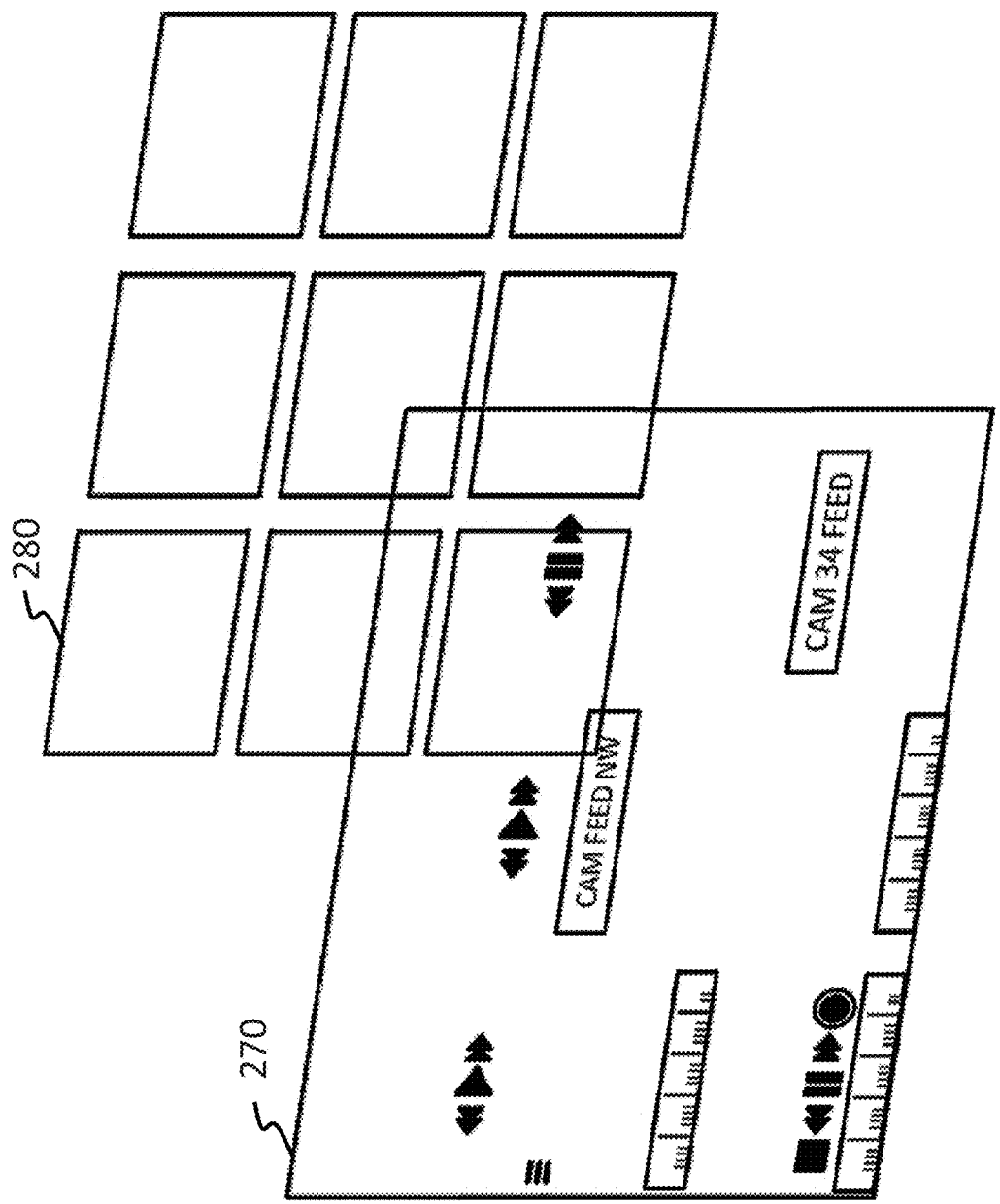
FIG. 10a shows an abstract collaboration between a series of transparent tiles and a semi-transparent window parent structure upon which various non-renderer components' visual elements are disposed.
Figure 10B:
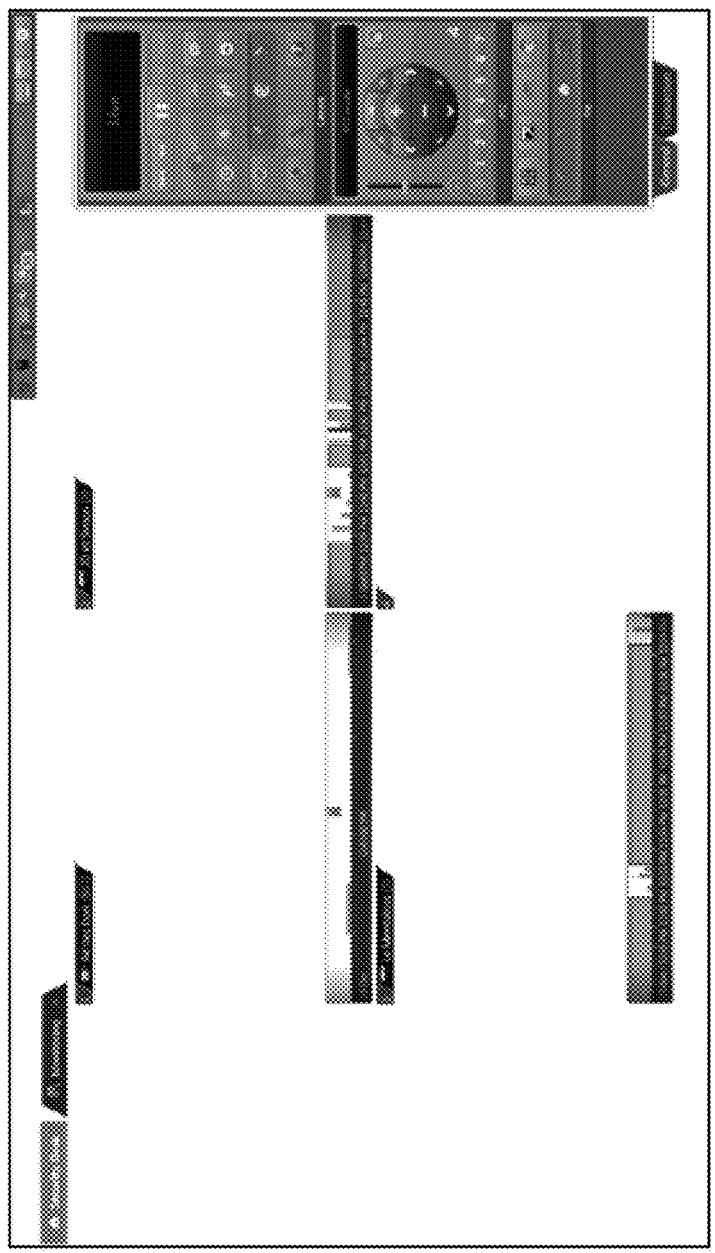
FIG. 10b shows a screenshot depicting the series of transparent tiles and the semi-transparent window parent structure in FIG. 10a in an example embodiment.

In another embodiment (FIG. 10a, FIG. 10b), non-renderer components 202 for a series of tiles may be specified a priori for subsequent composition 206, further described herein.

Visual elements 203 may be appreciated superposed or overlaid—as further discussed herein—atop the visual output 205 resulting from the work of one or more out-of-process renderer components 204).

It will be appreciated that just as the presence and disposition of non-renderer components 202 may be either specified in bulk (FIG. 10a) within a number of tiles 280 of the semi-transparent window structure 270 or alternatively specified and disposed by a user on a tile-by-tile basis (FIG. 9), said non-renderer components 202 may be combined, even within a single tile 280, each component operating in-process or out-of-process. No limit other than practical considerations or the technical constraints of a non-renderer 202 component itself need be placed on the execution of a component 202.

While the work of positioning visual elements 203 is the task of the arraying module 230, further described herein, it will be appreciated that the non-renderer components' 202 visual elements 203' are in embodiments typically situated superjacent to the visual outputs 205 received from the latter's respective out-of-process renderer components 204. Recall that the out-of-process renderer components 204 typically render the scenes 402 captured 401 by one or more video feeds 201 received by embodiments. This allows for a typical tile 280 layout in which the scene content 402 corresponding to a video feed 201 is in the background, with specified visual elements 203 for each of said tiles 280 superposed and occupying the foreground (FIG. 5*b*, FIG. 6, FIG. 7).

It will be appreciated that the detection of anomalous operation of any one or more non-renderer components 202 can in embodiments be implemented in a manner similar to that discussed herein for out-of-process renderer components 204, namely by way of communication between the watchdog module 240 and each non-renderer component 202. Likewise, a condition parameter set similar to the one described herein for detecting the anomalous operation for out-of process render components 204 may be contemplated, with the appropriate modifications, to accordingly detect the occurrence of an one or more non-renderer components' 202 anomalous operation.

It will likewise be appreciated that detection of anomalous operation of any one or more non-renderer components 202 can in embodiments be implemented by way of a two-way communication channel between the event dispatcher module 220 and each one of said non-renderer components 202, or alternatively communicated by the respective visual element(s) 203 resulting from the execution of said component(s) 202 to the event dispatcher module 220. The discussion provided regarding a set of condition parameters to detect the occurrence of specific operational issues may likewise be applied for such embodiments.

Anomalous operation of non-renderer components 202 may be terminated, restarted, and handled in a manner akin to that described for out-of-process renderer components 204. For example, options to proceed following anomalous termination of one or more non-renderer components 202 may include a prompt or popup window that provides one or more users with a positive or negative decision to terminate or restart said one or more component(s) 202.

Scenes and Cameras

Figure 11:
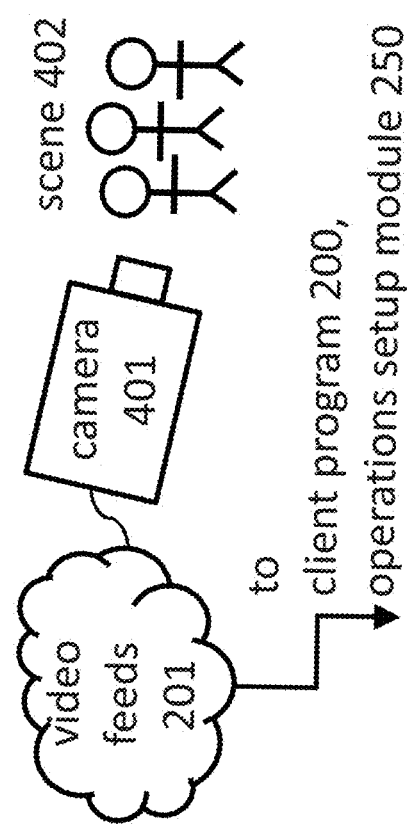
FIG. 11 shows a detailed view of the relationship between video feeds, capture device such as a camera, and a scene to capture with respect to the remainder of the module structure of the client program.

As discussed in various sections herein, embodiments may (FIG. 11) capture scenes 402 of any type, sort, or nature in any conceivable environment. Said scenes 402 may be captured using a camera 401 or any other appropriate capture device, which converts said scenes 402 into one or more video feed 201. The format of said feed 201 is not intended to be constrained to any format but may be of any format, variety, or type, and follow any technical specification. Variants on splitting, subtracting, adding, and/or merging content into feeds 201 may also be contemplated. To cite several non-limiting examples, such variants may include removing color information from a feed as collected from a (color) camera 401, adding colorizing information, or applying an image registration algorithm to one or more scenes 402 captured by one or more cameras 401 to stitch the foregoing into an enhanced feed 201 covering a wider scene 402 area than the original constituent captures.

Video Feeds

Video feeds 201 are captured using any one or more capture devices—namely cameras. However, such feeds 201 need not be received from video cameras but may be provided by any other one or more signal sources. In embodiments, such video signal capture devices may be disposed without limitation about any one or more geographical or topographical zones, areas, locations, or territories, and cover scenes 402 of any conceivable variety, such as a country's highway system, a busy shopping mall, a remote desert site, or a lunar mission. In addition, the coverage area captured by said capture devices may be entirely unconstrained, and may be variable and/or uncontiguous. Likewise, the nature of the image and/or video data acquired by said capture devices may differ from one said capture device to another capture device disposed within an embodiment. Such differences may include, without limitation, the actual scene(s) 402 to capture and the format of the images produced or output by said capture devices 401, including the resolution, framerate, and data encapsulation type of said images to capture and share. In another embodiment, additional information may be captured by said capture devices, such as sound or depth. In a still further embodiment, such additional information to capture may include non-visible parts of the electromagnetic spectrum, such as the infrared region. Furthermore, video feeds 201 captured and provided to an embodiment may be accessible exclusively by said embodiment, or may alternatively be provided and/or shared in accordance with a specific access control policy. Feeds may likewise be captured and shared with embodiment live—whether immediate or with negligible or minimal delay. In another embodiment, the feeds may be retrieved by embodiments from a location in which they may have been previously stored; such playback be deferred or otherwise time-shifted.

Operations Setup Module

The operations setup module 250 performs several managing roles within embodiments. It may receive the video feeds 201, typically from cameras and/or other capture sources described herein, said feeds being collected external to the client program 200. Furthermore, the operations setup module 250 receives instructions received from the event dispatcher module 220 to issue specific configuration-related commands to the window module 260 as further discussed herein, and from which it also receives operational feedback relating to the condition of window module 260 output, including without limitation, the semi-transparent windows parent structure 270 and the individual tiles 280 and the contents therein, shown on the display 208. While in embodiments, the operations setup module can 250 receive the feed and pass it through to 204, it may likewise be possible for the operations setup module 250 to pass an instruction to the out-of-process renderer component 204 so that the latter may be responsible for receiving video feeds 201 directly. Such direct routing of feeds 201 to out-of-process renderer components 204 may be configured to advantageously reduce transmission overhead.

The setup module 250 also participates in message passing operations, particularly between event dispatcher module 220 and window module 260 and watchdog module 240 and window module 260, as further discussed herein.

Likewise, the operations setup module 250 communicates with a resource pool comprising a number of renderer components 204 whose role and interconnections are further described herein. For such interaction, the setup module 250 is typically provided with the ability to access components outside the client program 200. Upon receiving notification from the event dispatcher module 220 that a new video feed 201 is to be added to a tile 280 within the semi-transparent window structure 270, the setup module 250 typically instantiates one or more out-of-process renderer components 204 to which it 250 has access, and further initializes said out-of-process renderer component(s) 204 for operation with an embodiment. Furthermore, initialization typically involves the allocation of an available out-of-process renderer component 204 for subsequent association with a specified video feed 201.

When an out-of-process renderer component 204 is available, the setup module 250 initializes it. In another embodiment, a specific policy may be elaborated or live selection may be made among any available out-of-process renderer component 204 available to the setup module 250. In cases where the watchdog module 240, as further described herein, detects anomalous operation of a specific out-of-process renderer component 204, the operations setup module 250 restarts or terminates said component 204, in accordance with any specific policy, instruction, input 210, 211, or other decision supplied to it by the watchdog module 240 and/or the event dispatcher module 220.

In an embodiment, the operations setup module 250 may be further configured to communicate the presence or other availability-related status of any one or more out-of-process renderer components 204. In a further embodiment, should a specified or otherwise desired out-of-process renderer component 204 be unavailable at a given time, the operations setup module 250 is configured to share the status with the window module 260, which can in turn issue a user-intelligible message to the display 208. Likewise, the setup module 250 may share a similar transaction with the window module when no component 204 is available. In such cases, one or more additional information messages may be issued to a user. In a still further embodiment, the user may likewise be provided with the option to specify, via any appropriate combination of input 210, 211, whether to deallocate or free a renderer component 204 currently in use for any specific video feed 201 and occupying a specific tile 280 within the display 208.

In addition, the operations setup module 250 also communicates with the watchdog module 240, in a cooperative capacity to implement message passing duties from said watchdog module 240 to the window module 260 as further elaborated herein.

Watchdog Module

The watchdog module 240 is an important component involved in the overall operation of embodiments. It implements portions of a fault isolation mechanism whereby the state of operation and/or execution process of the various out-of-process renderer components 204 and non-renderer components 202 may be monitored for inactivity, delay, or other anomalous operation. For the purposes of embodiments disclosed herein, anomalous operation may be appreciated as being any undesirable activity, lack of activity, performance quality, temporary or permanent degradation, or other aspect of functionality that includes, without limitation, the operation of out-of-process renderer components 204 and non-renderer components 202 operating within the scope of one or more said embodiments. The general functions of the watchdog module 240 in embodiments may variously include guarding against anomalous operation, of warning users of the occurrence of said anomalous operation, and of reacting to any of potentially several types of anomalous operation.

In embodiments, the inactivity or delay of response may be specified within a parameter list within the watchdog module 240, or any other module within the client program 200 or external entity interacting with it 200. In a further embodiment, the watchdog module 240 may implement or otherwise rely upon one or more timers, for example, for each of the non-renderer 202 and renderer 204 components present within an embodiment and/or which must be monitored. A further subcomponent, also configurable in some embodiments, may also allow a user to configure the precise set of functional parameters, constraints, behaviors, and policies by which said watchdog module 240 must operate.

Such a set of parameters may include any or all of the non-renderer 202 and renderer 204 components present within an embodiment, which may accordingly be monitored for any one or more of inactivity or delay of response beyond a specified duration. In a further embodiment, such monitoring may likewise include functionality to detect performance lags and in a still further embodiment, performance surpluses.

Once the aforementioned specified duration elapses, the watchdog module may take any of various actions, whether corrective or terminal. Such corrective action may in an embodiment consist of restarting any one or more of an out-of-process renderer 204 or non-renderer 202 component following any form of anomalous operation thereof. In a further embodiment, the watchdog module may be configured to automatically restart any one or more of the latter components 202, 204 following their anomalous operation. In another embodiment, the watchdog module 240 may activate an alarm or instruct another available or otherwise redundant non-renderer component 202 or renderer component 204 to take over the load of the component having previously functioned anomalously.

In another embodiment, the watchdog module 240 may receive performance monitoring information from non-renderer components 202 and/or renderer components 204. When provided with such information, a performance analysis submodule, typically functioning within the watchdog module 240 may take precautionary measures to avoid the occurrence of anomalous operation. Such precautionary measures may consist of validating the impending occurrence anomalous operation to an instance of one or another type of component 202, 204 and issue a command to initiate an automatic failover to another redundant non-renderer 202 or renderer component 204. In a further embodiment, an intermediary state during which a portion or the entirety of a component's state is temporarily saved may be traversed in instants prior to said failover so as to cause minimal disruption in the operation as perceived by a human user of said component 202, 204 as a result of anomalous operation.

It will be appreciated that the watchdog module 240 may likewise initiate additional types of action, whether of a corrective or recovery nature, which may include performing operations upon other modules not necessarily contained within the client program 200. In another embodiment, especially in a case in which corrective action is not possible, such action may likewise additionally include initiating a processor reset. Likewise, the watchdog module 240 may, based on the decision-making capabilities available to it, as a result of a previously set policy, or further to user instruction, terminate any one or more out-of-process renderer components 204 or non-renderer components 202.

It will be appreciated that said decision-making capabilities can include a set of one or more parameters configured to detect the occurrence—or lack thereof—of any number of conditions indicating (or potentially indicating) anomalous operation of one or more non-renderer component(s) 202 or out-of-process renderer component(s) 204.

In another embodiment, the watchdog module 240 may issue instructions to the window module 260 (by way of the operations setup module 250) to direct the window module 260 to issue any of various notifications or prompts to users, as further described herein. In a further embodiment, and where logically appropriate, the watchdog module 240 may be further configured to implement the production of error logs or other exception handling-related reporting for purposes of troubleshooting. Likewise, in a manner described previously herein, the watchdog module 240 can instruct the window module 260 to present to one or more users a message describing the occurrence of anomalous operation—or alternatively the occurrence of a condition corresponding to at least one parameter within the aforementioned parameter set. Said message may further include a prompt or request that a user authorize the restarting and/or the termination of said non-renderer 202 or renderer 204 component(s).

As discussed herein, the various prompts and notification messages presented by the window module 260 may be any of several interrupt types, such as maskable or non-maskable, the nature of which may in a further embodiment depend on the severity of the specific exception to report. Likewise, it will be appreciated that the type of interrupt generated as a result of an instance of anomalous behavior may vary in accordance with implementation-based considerations. In a non-limiting enumeration such interrupts may be a hardware and/or software type. Furthermore, individual interrupts may be edge-triggered, level-triggered, message-signaled, or any hybrid form of any known interrupt type. Such hybridization is particularly well suited if the exception to signal includes additional forensic and/or troubleshooting information on the events leading up to the anomalous operation of said component(s) 202, 204.

It will be further appreciated that the watchdog mechanisms described herein are particularly valuable in detecting anomalous operations in third party components, such as might be obtained under an open source license, or from an unknown party.

In its capacity as an operational component of embodiments described herein, it will likewise be appreciated that the watchdog module 240 may in some of said embodiments reside within the client program 200. Consistent with the out-of-process optimization sought in designs and in embodiments described herein, the watchdog module 240 may more optimally reside outside the client program 200, and in at least some of such embodiments may further execute within an external process, said process being a dedicated one. In a manner further discussed herein, the process, operation, data properties, or data assets that additionally constitute the watchdog module 240 need not—whether individually or as a group—have an entirely internal or external disposition; in some embodiments any or all of the foregoing may be internal or external to the client program 200.

Additional Observations

While a large number of embodiments deriving from the modules variously described herein have been non-limitingly proposed and described, it will be appreciated that additional elements may be likewise contemplated.

In a further embodiment, such elements may include the incorporation of authorization privileges or settings allowing specific users or categories of users to operate any one or more modules or perform any one or more specific actions.

In another embodiment, any part, module, or submodule of the client program 200, or any portion external to it, may be implemented on any one or more computers. Likewise, numerous network and other deployment topologies may be contemplated. In a related series of embodiments, the client program 200 need neither be deployed nor operate contiguously or be physically contained within a given site.

The functionality described for any module and/or embodiment herein may be functionally implemented, in another embodiment, whether in whole or in part, within any other module whose functionality has (or alternatively has not) otherwise been described herein. Likewise, any duplication or additional instantiation of any module, component or element described herein may likewise be contemplated without departing from the essence of the various embodiments discussed hereinabove.

In addition, embodiments contemplated herein include variants, or portions thereof, contained upon any form or kind of tangible, computer- or machine-readable storage medium to implement any part of any structure or for performance of any part or all operation for the embodiments described herein, or other embodiments related thereto. Such a medium may in an embodiment be a virtual or cloud storage site. In a further embodiment such a site may be secured with access permissions.

In a still further embodiment, any or all of the modules described herein may allow one or more users to run an instantiated client session on a cloud or remote server, the client session enabling one or more users to perform any or all of the actions described for other embodiments disclosed herein. In the course of said session, which in a series of further embodiments may include the possible use of existing or proprietary communication and application protocols and services which provide support for communications occurring in real-time and over multiple nodes, the server may send the client any or all of the commands, message windows, popups, prompts, or other information as disclosed in any other embodiment herein.

The above description has been provided for the purpose of illustrating, not limiting the invention which is defined by the appended claims.

What is claimed is:

1. A method of presenting a plurality of security camera feeds within a security video monitoring system for interaction by a user, said method comprising:
    executing a first program within an operating system of said security video monitoring system for implementing a semi-transparent window parent structure comprising an array of transparent tiles, each of said array of transparent tiles having specific positions and dimensions defined by user input through said operating system;
    running a plurality of out-of-process renderer components under said operating system of the security video monitoring system, said plurality of out-of-process renderer each receiving a camera feed from one of said plurality of security camera feeds and providing a video output resulting in a plurality of video outputs in separate windows controlled by said operating system;
    positioning, and dimensioning each of said separate windows of said plurality of video outputs within one tile of said array of transparent tiles according to said specific dimensions with said semi-transparent window parent structure masking said separate windows of said plurality of video outputs;
    wherein the user can make changes to said semi-transparent window parent structure and the video outputs change according to said changes to said semi-transparent window parent structure; and
    monitoring said out-of-process renderer components for anomalous operation to detect failure of any of said out-of-process renderer components, and in response to said failure, restarting said out-of-process renderer components independently without affecting said semi-transparent window parent structure or other ones of said out-of-process renderer components that have not failed.

2. The method defined in claim 1, further comprising causing visual elements of one or more non-renderer components, said non-renderer components operating out-of-process, to be displayed superjacent to said visual outputs and subjacent to said tiles.

3. The method defined in claim 1, further comprising accepting user input for one or more specific positions within said window parent structure and dispatching corresponding commands to out-of-process components at said one or more specific positions.

4. The method defined in claim 2, further comprising receiving user input to scale ones of said visual elements in proportion to a change in dimension of said window parent.

5. The method defined in claim 1, further comprising notifying one or more human users of said anomalous operation by way of a dialog box, further comprising presenting to one or more human users one or more decisions on how to proceed following said anomalous operation.

6. A non-transitory machine-readable storage medium for implementing a security video monitoring client for presenting a plurality of security camera feeds, said medium comprising instructions for causing a processing device to perform the method as defined in claim 1.

7. The medium defined in claim 6, further comprising instructions for causing a processing device to display visual elements of one or more non-renderer components, said non-renderer components operating out-of-process, being situated superjacent to said visual outputs and subjacent to said tiles.

8. The medium defined in claim 6, further comprising instructions for causing a processing device to accept user input for one or more a specific positions within said window parent structure and to dispatch corresponding commands to out-of-process components at said one or more specific positions.

9. The medium defined in claim 7, further comprising instructions for causing a processing device to receive user input to scale ones of said visual elements in proportion to a change in dimension of said window parent.

10. The medium defined in claim 6, further comprising instructions for causing a processing device to monitor an execution status of said out-of-process renderer components and to terminate any one or more said out-of-process renderer components following anomalous operation thereof.

11. The medium defined in claim 6, further comprising instructions for causing a processing device to monitor an execution status of said out-of-process renderer components and restarting any one or more said out-of-process renderer components following anomalous operation thereof.

12. The medium defined in claim 6, further comprising instructions for causing a processing device to prompt one or more users to authorize said restarting upon occurrence of a condition corresponding to at least one parameter within a condition parameter set, wherein said prompting of one or more users is accomplished by causing said window parent module to display a dialog box to said one or more users, said dialog box comprising an information message and presenting said one or more users with one or more options to proceed.

13. The method defined in claim 1, further comprising notifying one or more human users of said anomalous operation by way of a dialog box, further comprising presenting to one or more human users one or more decisions on how to proceed following said anomalous operation.

* * * * *